United States Patent
Antipin et al.

(10) Patent No.: US 12,493,326 B2
(45) Date of Patent: Dec. 9, 2025

(54) ELASTIC BILINEAR STRUCTURE FOR IMPACT FORCE MITIGATION

(71) Applicant: CORNING INCORPORATED, Corning, NY (US)

(72) Inventors: Nikolai Aleksandrovich Antipin, Helsinki (FI); Petr Gorelchenko, Elmira, NY (US); Matija Guzijan-Dilber, Espoo (FI); Sergey Nikolaevich Shubin, Espoo (FI)

(73) Assignee: CORNING INCORPORATED, Corning, NY (US)

( * ) Notice: Subject to any disclaimer, the term of this patent is extended or adjusted under 35 U.S.C. 154(b) by 192 days.

(21) Appl. No.: 18/382,266

(22) Filed: Oct. 20, 2023

(65) Prior Publication Data

US 2024/0134421 A1 Apr. 25, 2024
US 2024/0231440 A9 Jul. 11, 2024

(51) Int. Cl.
*G06F 1/16* (2006.01)
*G02F 1/1333* (2006.01)
*H04M 1/02* (2006.01)

(52) U.S. Cl.
CPC ...... *G06F 1/1656* (2013.01); *G02F 1/133317* (2021.01); *H04M 1/0266* (2013.01)

(58) Field of Classification Search
CPC .............. H04M 1/0266; H04M 1/185; G02F 1/133317; G02F 1/1656
See application file for complete search history.

(56) References Cited

U.S. PATENT DOCUMENTS

| | | | | |
|---|---|---|---|---|
| 3,911,670 A | * | 10/1975 | Hofer | G04B 39/006 968/371 |
| 6,809,916 B2 | * | 10/2004 | Nakata | F16F 15/04 361/115 |
| 8,014,142 B2 | * | 9/2011 | Prest | H05K 5/03 349/56 |
| 8,436,958 B2 | * | 5/2013 | Lee | H10K 59/87 349/40 |
| 8,773,848 B2 | * | 7/2014 | Russell-Clarke | H05K 5/10 348/739 |
| 9,186,844 B2 | | 11/2015 | Balcom et al. | |

(Continued)

FOREIGN PATENT DOCUMENTS

CN 208190752 U 12/2018
KR 10-1878982 B1 7/2018
(Continued)

OTHER PUBLICATIONS

Rybicki et al., Simple Shock Isolator Synthesis with Bilinear Stiffness and Variable Damping, Jun. 1, 1965, NASA Technical Reports Server, Document ID 19650023284.*

(Continued)

*Primary Examiner* — Adrian S Wilson

(57) ABSTRACT

Devices comprising a structure comprising a bilinear elastic property in compression for mitigating impact forces. In aspects, the device can comprise a frame with the structure comprising a bilinear elastic property in compression. In aspects, the device can comprise a cover glass layer and an electronic display, and the structure comprising a bilinear elastic property in compression is configured to mitigate the effect of impact forces on the cover glass layer, the electronic display, or both.

20 Claims, 18 Drawing Sheets

(56) References Cited

U.S. PATENT DOCUMENTS

| | | | |
|---|---|---|---|
| 9,632,537 B2* | 4/2017 | Memering | G06F 1/1613 |
| 9,678,540 B2* | 6/2017 | Memering | G06F 1/1626 |
| 10,450,218 B2 | 10/2019 | Hashimoto et al. | |
| 11,375,784 B2* | 7/2022 | Dannoux | H04M 1/185 |
| 2002/0043608 A1* | 4/2002 | Nakata | G06F 1/181 |
| | | | 248/560 |
| 2006/0254107 A1* | 11/2006 | Watanabe | G09F 9/00 |
| | | | 40/768 |
| 2006/0273304 A1* | 12/2006 | Cok | H10K 50/841 |
| | | | 438/26 |
| 2007/0138920 A1* | 6/2007 | Austin | H05K 5/0217 |
| | | | 312/352 |
| 2007/0190274 A1* | 8/2007 | Hamaguchi | C04B 35/524 |
| | | | 428/34.4 |
| 2008/0223708 A1* | 9/2008 | Joo | G06F 3/041 |
| | | | 361/728 |
| 2013/0002583 A1* | 1/2013 | Jin | G06F 3/041 |
| | | | 313/511 |
| 2013/0029075 A1* | 1/2013 | Niiyama | G02F 1/133308 |
| | | | 156/247 |
| 2013/0034685 A1* | 2/2013 | An | H10K 59/871 |
| | | | 156/222 |
| 2013/0083496 A1* | 4/2013 | Franklin | G06F 3/044 |
| | | | 361/752 |
| 2014/0355195 A1* | 12/2014 | Kee | H04M 1/0268 |
| | | | 361/679.27 |
| 2016/0062405 A1* | 3/2016 | Mylvaganam | G04B 39/006 |
| | | | 427/259 |
| 2016/0286671 A1* | 9/2016 | Ahmed | H04M 1/185 |
| 2016/0370617 A1* | 12/2016 | Miyashita | G02F 1/133308 |
| 2017/0307040 A1 | 10/2017 | Schaedler et al. | |
| 2019/0278394 A1* | 9/2019 | Myers | H04M 1/0269 |
| 2020/0057525 A1* | 2/2020 | Prest | G06F 3/04886 |
| 2020/0348730 A1* | 11/2020 | Foo | B32B 17/06 |
| 2021/0096601 A1* | 4/2021 | Chen | G06F 1/1637 |
| 2021/0112685 A1* | 4/2021 | Magi | F16F 15/08 |
| 2022/0057834 A1* | 2/2022 | Jang | G06F 1/1616 |
| 2023/0052509 A1* | 2/2023 | Wang | B32B 37/00 |

FOREIGN PATENT DOCUMENTS

| | | |
|---|---|---|
| WO | 2010/132324 A3 | 5/2011 |
| WO | 2014/168662 A2 | 10/2014 |

OTHER PUBLICATIONS

"Custom disc springs", Retrieved from: https://www.asbg.com/products/spring-washers/disc-springs.aspx, 2024, 3 pages.

* cited by examiner

ELASTIC BILINEAR STRUCTURE FOR IMPACT FORCE MITIGATION

CROSS-REFERENCE TO RELATED APPLICATION

This application claims the benefit of priority under 35 U.S.C. § 119 of Russian Application No. 2022127625 filed on Oct. 25, 2022, the content of which is relied upon and incorporated herein by reference in its entirety.

FIELD

The present disclosure relates to structures comprising a bilinear elastic property in compression for use in various industries, for example, consumer electronics, transportation, architecture, defense, medicine, and packaging. Even more specifically, the present disclosure relates to frame structures comprising a bilinear elastic property in compression for cover glass applications, for example, cover glasses for an electronic display.

BACKGROUND

Many consumer products, for example smart phones, tablets, portable media players, personal computers, and cameras, incorporate cover glasses that can function as display covers, and can incorporate touch functionality. Frequently, these devices are dropped by users onto hard surfaces, which can cause damage to the cover glasses, and may negatively impact the use of the devices. For example, the touch functionality or display characteristics of the device can be compromised. Handheld electronics in particular (for example, smartphones, tablets, etc.) pose challenges for an impact force reduction because they can require complete restitution of the device to its original condition after impact.

Therefore, a continuing need exists for materials or structures designed to protect consumer products from damage in a variety of applications, including consumer products comprising cover glasses.

BRIEF SUMMARY

The present disclosure is directed to structures comprising a bilinear elastic property in compression. The bilinear elastic property can be designed to mitigate the effect of forces on a cover glass layer during an impact event. The bilinear elastic property in compression can be a bilinear elastic modulus, a bilinear compressive stiffness, or both. Characteristics of the bilinear elastic property that can be tailored to achieve desired force mitigation include, but are not limited to, a first elastic modulus in compression, a second elastic modulus in compression, a first compressive stiffness, a second compressive stiffness, and a displacement value at which the structure transitions from the first compressive stiffness to the second compressive stiffness. In aspects, the structures can have a frame-shape configured to support a cover glass layer for an electronic display.

A first aspect (1) of the present application is directed to a device, comprising: a support; an electronic display comprising a display surface; a cover glass layer disposed over the display surface; and a frame disposed between the cover glass layer and the support, the frame comprising a structure comprising a bilinear elastic property in compression.

In a second aspect (2), the bilinear elastic property in compression according to the first aspect (1) is a bilinear compressive stiffness defined by a slope of a force versus displacement curve for a top surface of the cover glass, the force versus displacement curve measured according to the Stiffness Test.

In a third aspect (3), the bilinear compressive stiffness according to the second aspect (2) comprises: a first linear slope over a first displacement range from zero displacement ($d_0$) to a first displacement value ($d_1$), and a second linear slope over a second displacement range from the first displacement value ($d_1$) to a second displacement value ($d_2$) greater than the first displacement value ($d_1$).

In a fourth aspect (4), the first linear slope according to the third aspect (3) is greater than the second linear slope.

In a fifth aspect (5), the first linear slope according to the fourth aspect (4) ranges from about 1.6 MN/m to about 1176 MN/m.

In a sixth aspect (6), the second linear slope according to either aspect (4) or aspect (5) ranges from about 0.04 MN/m to about 37.5 MN/mm.

In a seventh aspect (7) the first displacement value ($d_1$) according to any one of aspects (4)-(6) is less than or equal to about 0.45 mm.

In an eighth aspect (8), the first displacement value ($d_1$) according to any one of aspects (4)-(6) ranges from about 0.01 mm to about 0.45 mm.

In a ninth aspect (9), the second displacement value ($d_2$) according to any one of aspects (4)-(8) ranges from about 0.5 mm to about 1.5 mm.

In a tenth aspect (10), the bilinear elastic property in compression according to the first aspect (1) is a bilinear elastic modulus in compression.

In an eleventh aspect (11), the bilinear elastic modulus in compression according to the tenth aspect (10) comprises: a first elastic modulus ($E_1$) measured over a first strain range from zero strain ($\varepsilon_0$) to a first strain value ($\varepsilon_1$), and a second elastic modulus ($E_2$) measured over a second strain range from the first strain value ($\varepsilon_1$) to a second strain value ($\varepsilon_2$) greater than the first strain value ($\varepsilon_1$).

In a twelfth aspect (12), the first elastic modulus ($E_1$) according to the eleventh aspect (11) is greater than the second elastic modulus ($E_2$).

In a thirteenth aspect (13), the structure according to any one of aspects (1)-(12) comprises at least one of a foam, a bistable beam, a spring, or a honeycomb structure.

In a fourteenth aspect (14), the structure according to any one of aspects (1)-(12) comprises a foam material.

In a fifteenth aspect (15), the foam material according to the fourteenth aspect (14) is an elastomeric foam.

In a sixteenth aspect (16), the frame according to any one of aspects (1)-(15) comprises a perimeter border and a hollow center region.

In a seventeenth aspect (17), at least a portion of the electronic display is disposed within the hollow center region of the frame according to the sixteenth aspect (16).

In an eighteenth aspect (18), the perimeter border according to the sixteenth aspect (16) or the seventeenth aspect (17) comprises a thickness ranging from about 1 mm to about 2 mm.

In a nineteenth aspect (19), the frame according to any one of aspects (1)-(18) is directly bonded to a bottom surface of the cover glass layer.

In a twentieth aspect (20), the cover glass layer according to any one of aspects (1)-(19) comprises a thickness ranging from about 100 microns to about 1 mm.

In a twenty-first aspect (21), the device according to any one of aspects (1)-(20) is a consumer electronic product comprising: a housing comprising the support, a front surface, a back surface, and side surfaces; and electrical components at least partially within the housing, the electrical components comprising a controller, a memory, and the electronic display, the electronic display at or adjacent the front surface of the housing, wherein the cover glass layer forms at least a portion of the housing.

A twenty-second aspect (22) of the present application is directed to an electronic display component, comprising: an electronic display comprising a display surface; a cover glass layer disposed over the display surface, the cover glass layer comprising a thickness ranging from about 1000 microns to about 1 mm; and a frame bonded to a bottom surface of the cover glass layer, the frame comprising a structure comprising a bilinear elastic property in compression.

In a twenty-third aspect (23), the bilinear elastic property in compression according to the twenty-second aspect (22) is a bilinear elastic modulus in compression.

In twenty-fourth aspect (24), the bilinear elastic property in compression according to the twenty-second aspect (22) is a bilinear compressive stiffness defined by a slope of a force versus displacement curve for a top surface of the cover glass, the force versus displacement curved measured according to the Stiffness Test.

BRIEF DESCRIPTION OF THE DRAWINGS

The accompanying figures, which are incorporated herein, form part of the specification and illustrate aspects of the present disclosure. Together with the description, the figures further serve to explain the principles of and to enable a person skilled in the relevant art(s) to make and use the disclosed aspects. These figures are intended to be illustrative, not limiting. Although the disclosure is generally described in the context of these aspects, it should be understood that it is not intended to limit the scope of the disclosure to these particular aspects. In the drawings, like reference numbers indicate identical or functionally similar elements.

DETAILED DESCRIPTION

Figure 1:
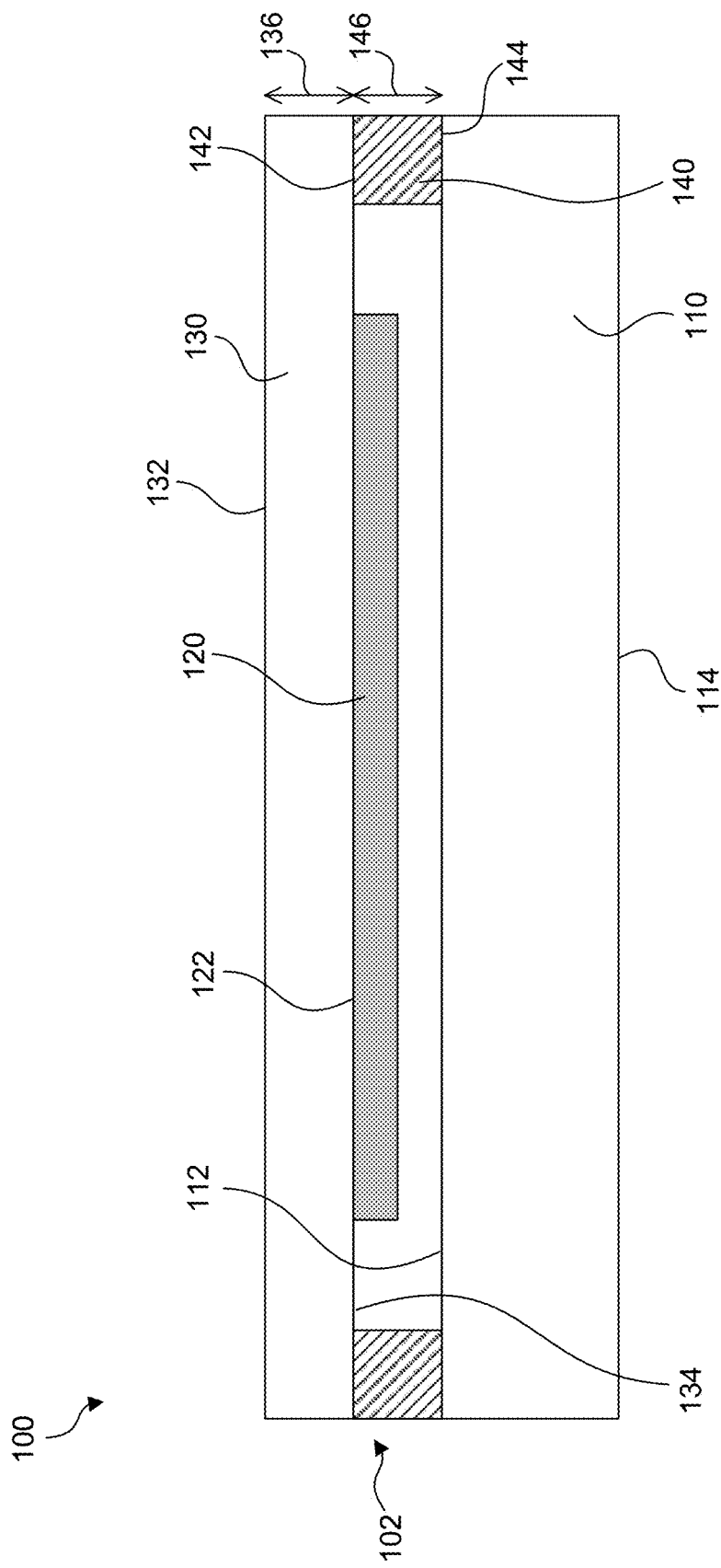
FIG. 1 illustrates a device according to aspects.

The following examples are illustrative, but not limiting, of the present disclosure. Other suitable modifications and adaptations of the variety of conditions and parameters normally encountered in the field, and which would be apparent to those skilled in the art, are within the spirit and scope of the disclosure.

Aspects of the present application are directed to structures having a bilinear elastic property designed to mitigate the effect of impact force on a device, for example impact forces resulting from a drop event. In aspects, the structure can be disposed between a cover glass layer and a support structure of a consumer electronic device. The structure can comprise a bilinear elastic mechanical response in compression. In other words, the structure can comprise a bilinear elastic property in compression. In aspects, this bilinear elastic response in compression can be a result of buckling within the structure. In aspects, the structure can comprise a bilinear elastic modulus in compression. In aspects, the structure can comprise a bilinear compressive stiffness defined by a slope of a force versus displacement curve for a top surface of the cover glass layer.

The bilinear elastic property in compression for structures according to aspects disclosed herein is capable of reducing contact forces during an impact event for a device comprising the structure. For example, the structures according to aspects disclosed herein are capable of reducing contact forces during a handheld device drop event. Thus, the structures can reduce the probability of failure for components of the device comprising the structure. In particular aspects, the bilinear structures can reduce the probability of a cover glass layer failure during an impact event. Reducing cover glass layer failure can reduce the probability of an electronic display screen failure (for example, due to screen cracking), and thus extend the life of the device comprising the structure.

Moreover, the structures according to aspects disclosed herein are capable of reducing contact forces while preventing or reducing permanent deformation of the device after impact. The elastic nature of the structure allows the structure to return to its original configuration (i.e., avoid permanent deformation), which in turn facilitates the return of the device to its original configuration as well.

The mechanical characteristics (for example, elastic modulus in compression or compressive stiffness) of structures according to aspects disclosed herein allow the structures to have a small thickness while still providing desired impact force mitigation. In aspects, the desired impact force mitigation can be achieved for a structure having a thickness of less than or equal to about 2 millimeters (mm). This ability to achieve the desired impact force mitigation at small thickness can benefit devices, such as handheld consumer devices, by keeping the size and/or weight of the devices at a minimum. Moreover, the ability to achieve the desired impact force mitigation at these small thickness can allow the structures to be incorporated into existing devices without the need to modify the devices' overall design. In aspects, the bilinear elastic response for structures described herein can reduce the maximum impact force applied to a cover glass layer or an electronic display by up to 50%, compared to a typical linearly elastic material having the same dimensions.

In aspects, the structure can be in the form of a frame having a perimeter border and a hollow interior. The frame-like structure according to aspects can be implemented in devices, such as smartphones or tablet computers, where a cover glass layer or an electronic display failure is most likely to occur at edges of the device. In such aspects, the frame can be positioned between a cover glass layer and the device's housing to reduce the effect of impact forces at the edges of the device where the cover glass layer and/or the electronic display are present. Moreover, in some devices, high stiffness regions can be located at edges of the device. For example, a cover glass layer can have high internal stiffness regions at the edges of the cover glass layer and/or the device. The position of the frame between the cover glass layer and the device's housing at the edges of the device can reduce the effect of impact forces where the high stiffness regions can promote cover glass layer and/or electronic display failure.

FIG. 1 illustrates a device 100 according to aspects. In aspects, device 100 comprises an electronic display component 102 and a support 110. In aspects, electronic display component 102 can comprise an electronic display 120, a cover glass layer 130, and a structure 140 comprising a bilinear elastic property in compression. In aspects, device 100 may not comprise an electronic display 120. In such aspects, device 100 can comprise a support 110 and a cover glass layer 130 disposed over at least a portion of the support 110.

Support 110 can comprise a top surface 112 and a bottom surface 114. In aspects, support 110 can comprise a housing configured to house various components of device 100. For example, support 110 can house electronic components of device 100, such as electronic circuit boards, memory, sensors, cameras, etc. In such aspects, the housing can comprise a cavity within which the electronic components are disposed. In aspects, all or a portion of electronic display 120 can be disposed within the cavity of the housing.

Electronic display 120 comprises a display surface 122. In aspects, the display surface 122 can be a top surface of electronic display 120. As used herein, the terms "top surface" and "bottom surface" reference the top and bottom surface of a layer, component, or device as is would be oriented during its normal and intended use with the top surface being the user-facing surface. For example, when incorporated into a device having an electronic display, the "top surface" of the electronic display refers to the top surface of the display as it would be oriented so that a user could view content displayed on the electronic display. In aspects, electronic display 120 can be, for example, a light emitting diode (LED) display or an organic light emitting diode (OLED) display.

Cover glass layer 130 comprises a top surface 132, a bottom surface 134, and a thickness 136 measured between top surface 132 and bottom surface 134. In aspects, thickness 136 can range from about 100 microns to about 1 mm, including subranges. For example, thickness 136 can range from about 100 microns to about 1 mm, from about 100 microns to about 900 microns, from about 100 microns to about 800 microns, from about 100 microns to about 700 microns, from about 100 microns to about 600 microns, from about 100 microns to about 500 microns, from about 100 microns to about 400 microns, from about 100 microns to about 300 microns, from about 100 microns to about 200 microns, from about 200 microns to about 1 mm, from about 300 microns to about 1 mm, from about 400 microns to about 1 mm, or from about 500 microns to about 1 mm, or within a range having any two of these values as endpoints.

In aspects, cover glass layer 130 can be disposed over display surface 122 of electronic display 120. In aspects, cover glass layer 130 can be disposed on display surface 122. In aspects, cover glass layer 130 can be bonded to display surface 122. In such aspects, a bottom surface 134 of cover glass layer 130 can be bonded to display surface 122. In aspects, a bottom surface 134 of cover glass layer 130 can be directly bonded to display surface 122.

As used herein, "disposed on" means that a first layer or component is in direct contact with a second layer or component. In other words, if a first layer or component is disposed on a second layer or component, there are no layers or components disposed between the first layer or component and the second layer or component. A first layer or component described as "bonded to" a second layer or component means that the layers or components are attached to each other via an adhesive layer. A first layer or component described as "directly bonded to" a second layer or component means that the layers or components are directly attached to each other via an adhesive layer with no intervening layers. If a first layer or component is described as "disposed over" a second layer or component, other layers may or may not be present between the first layer or component and the second layer or component. A first layer or component described as "disposed on" or "disposed over" a second layer or component does not imply that the first layer or component and the second layer or component were assembled in any particular order. Unless specified otherwise, the first layer or component and the second layer or component can be assembled in any order.

Structure 140 is disposed between cover glass layer 130 and support 110. In aspects, structure 140 can be disposed between bottom surface 134 of cover glass layer 130 and top surface 112 of support 110.

Structure 140 comprises a top surface 142, a bottom surface 144, and a thickness 146 measured between top surface 142 and bottom surface 144. In aspects, top surface 142 can be bonded to bottom surface 134 of cover glass layer 130. In aspects, top surface 142 can be directly bonded to bottom surface 134 of cover glass layer 130. In aspects, bottom surface 144 can be bonded to top surface 112 of support 110. In aspects, bottom surface 144 can be directly bonded to top surface 112 of support 110.

In aspects, thickness 146 can range from about 1 mm to about 2 mm, including subranges. For example, thickness 146 can range from about 1 mm to about 2 mm, from about 1 mm to about 1.75 mm, from about 1 mm to about 1.5 mm, from about 1 mm to about 1.25 mm, from about 1.25 mm to about 2 mm, from about 1.5 mm to about 2 mm, or from about 1.75 mm to about 2 mm, or within a range having any two of these values as endpoints.

Structure 140 can comprise one or more materials comprising a bilinear elastic property in compression, one or more mechanical structures comprising a bilinear elastic property in compression, or both.

Figure 3:
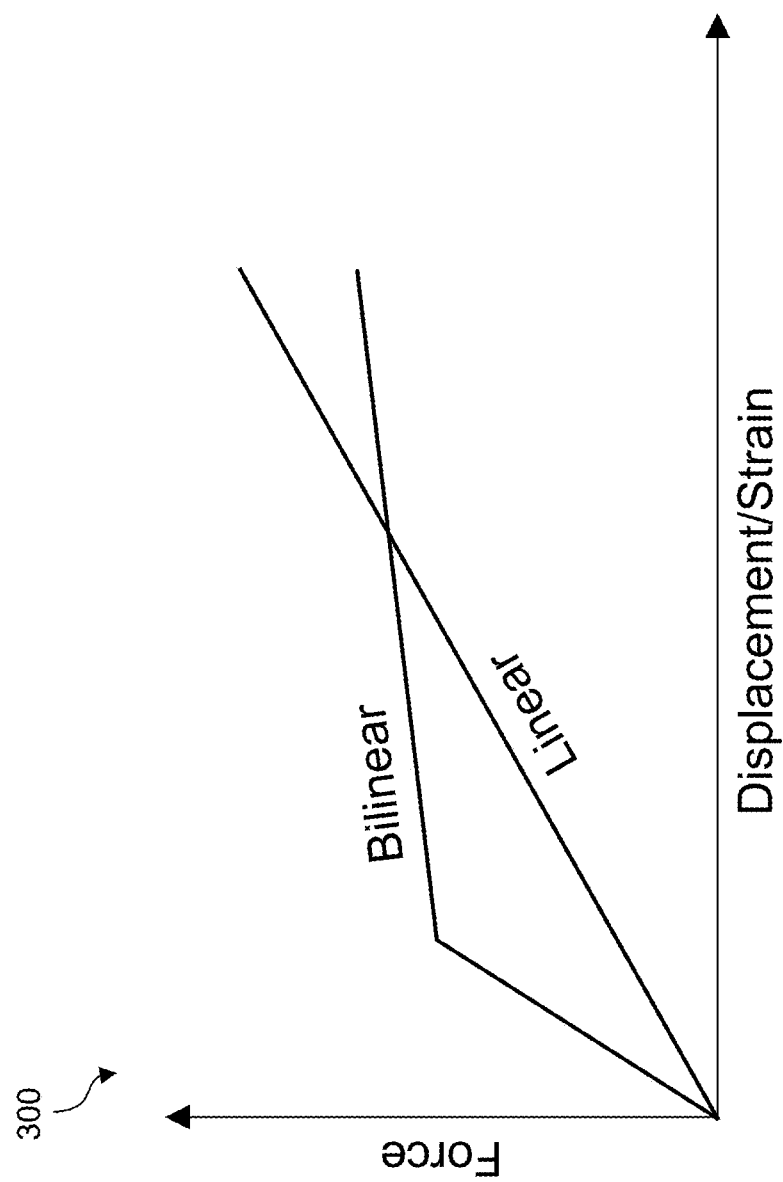
FIG. 3 is a graph illustrating linear and bilinear elastic behavior.

A structure comprising a bilinear elastic property in compression means the structure has a first linearly elastic property value across a first range of displacement or strain and a distinct, second linearly elastic property value across a second range of displacement or strain immediately after the first range of displacement or strain. The first range of displacement or strain starts at a displacement or strain of zero. In contrast, a structure comprising a linear elastic property in compression has only one linearly elastic property value across the first and second ranges of displacement or strain. Graph 300 in FIG. 3 illustrates the difference between a bilinear elastic property in compression and a linear elastic property in compression.

In aspects, the bilinear elastic property in compression can be a bilinear compressive stiffness and structure 140 can comprise a bilinear compressive stiffness defined by a slope of a force versus displacement curve for a top surface 132 of cover layer glass 130, the force versus displacement curve measured according to the Stiffness Test. In aspects, the bilinear elastic property in compression can be a bilinear elastic modulus in compression and structure 140 can comprise a material comprising a bilinear elastic modulus in compression. In aspects, structure 140 can be a material comprising a bilinear elastic modulus in compression.

Figure 2:
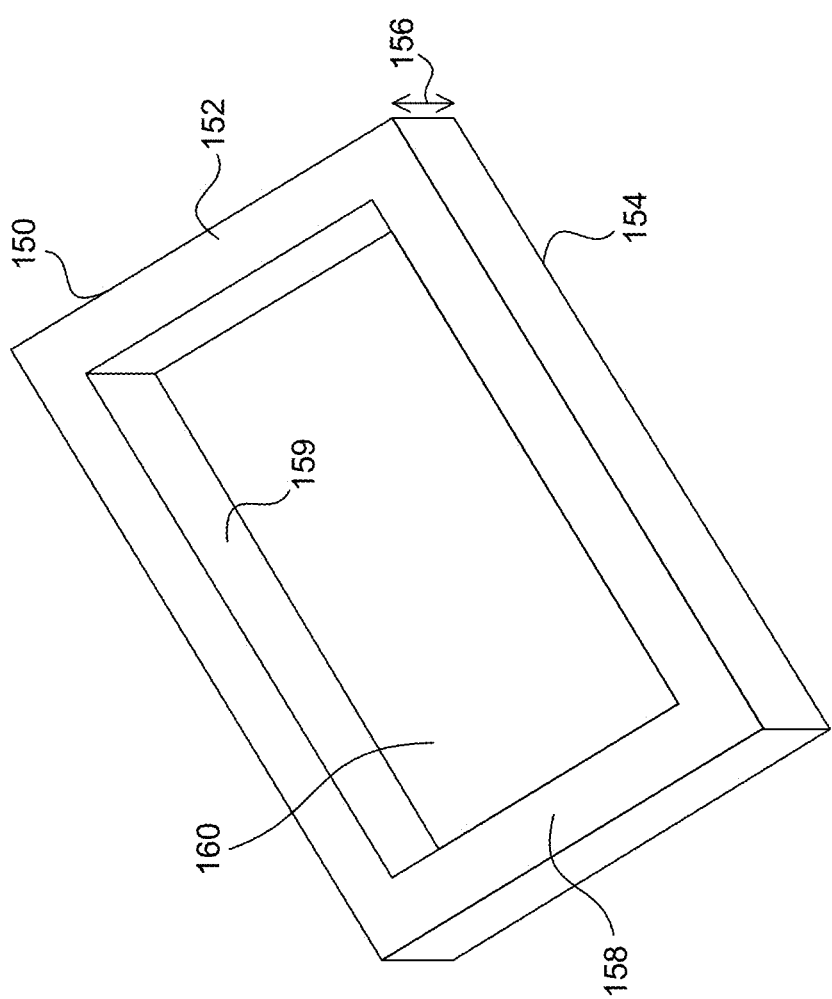
FIG. 2 illustrates a frame according to aspects.

In aspects, bilinear structure 140 can comprise a frame-shaped structure. In such aspects, a frame 150 can comprise structure 140. As shown for example in FIG. 2, frame 150 can comprise a top surface 152, a bottom surface 154, and a thickness 156 measured between top surface 152 and bottom surface 154. Frame 150 also comprises a perimeter border 158 and a hollow center region 160. Hollow center region 160 can be defined by an interior wall 159 of perimeter border 158. In aspects including frame 150, at least a portion of electronic display 120 can be disposed within hollow center region 160.

In aspects, thickness 156 of frame 150 can range from about 1 mm to about 2 mm, including subranges. For example, thickness 156 can range from about 1 mm to about 2 mm, from about 1 mm to about 1.75 mm, from about 1 mm to about 1.5 mm, from about 1 mm to about 1.25 mm, from about 1.25 mm to about 2 mm, from about 1.5 mm to about 2 mm, or from about 1.75 mm to about 2 mm, or within a range having any two of these values as endpoints.

In aspects, frame 150 can be bonded to bottom surface 134 of cover glass layer 130. In aspects, frame 150 can be directly bonded to bottom surface 134 of cover glass layer 130. In aspects, top surface 152 of frame 150 can be bonded to bottom surface 134 of cover glass layer 130. In aspects, top surface 152 can be directly bonded to bottom surface 134 of cover glass layer 130. In aspects, bottom surface 154 of frame 150 can be bonded to top surface 112 of support 110. In aspects, bottom surface 154 can be directly bonded to top surface 112 of support 110.

Figure 4:
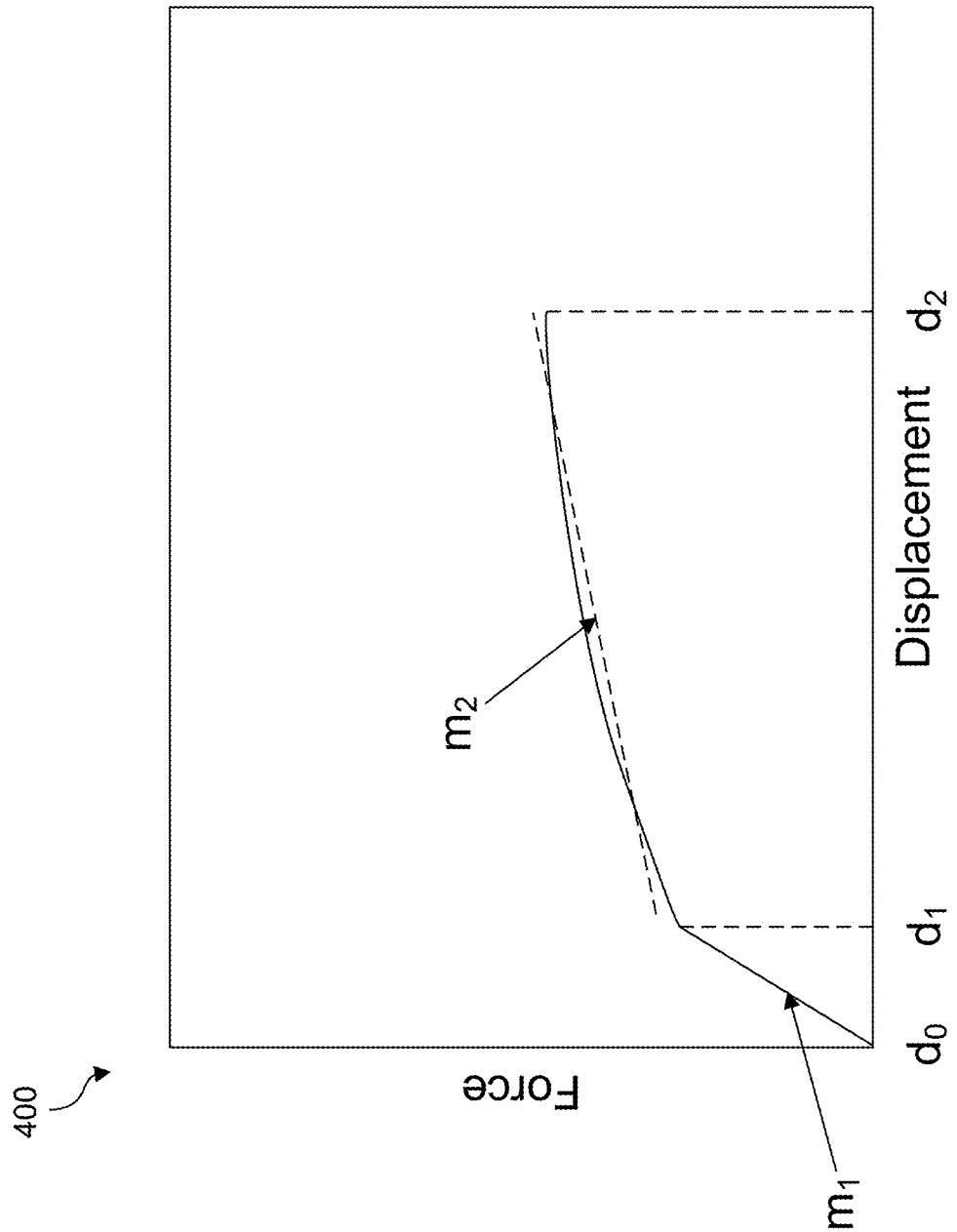
FIG. 4 is a graph illustrating a bilinear compressive stiffness according to aspects.

As used herein, the "Stiffness Test" is performed as follows. The Stiffness Test is performed on a device comprising a cover glass layer, a support, and a structure 140 disposed between the cover glass layer and the support such that, when force is applied to a top surface of the cover glass layer, that force is transferred directly to the bilinear structure 140. In the Stiffness Test, compression plates are placed on opposite sides of the device, with one compression plate in direct contact with the top surface of the cover glass layer and the other compression plate in direct contact with the bottom surface of the support. The surface of the compression plates should cover at least a majority of the top surface of the cover glass layer and at least a majority of the bottom surface of the support, respectively. Then, the stiffness of the device is tested according to the procedure of ASTM D1621 ("Standard Test Method for Compressive Properties of Rigid Cellular Plastics"), modified for preforming the test on an assembled device comprising the cover glass layer, support, and structure 140. During the test, a deflectometer is directly attached to the compression plates as described in ASTM D1621 and an increasing compressive force is gradually applied until the displacement of the top surface of the cover glass layer reaches about 80% of the initial thickness of structure 140 (i.e., thickness 146 or 156). The resulting force versus displacement is measured and plotted in a force versus displacement curve. Graph 400 shown in FIG. 4 is an exemplary force versus displacement curve for the Stiffness Test.

As shown in graph 400, the bilinear elastic compressive stiffness of structure 140 comprises a first linear slope ($m_1$) over a first displacement range from zero displacement ($d_0$) to a first displacement value ($d_1$) and a second linear slope ($m_2$) over a second displacement range from the first displacement value ($d_1$) to a second displacement value ($d_2$) greater than the first displacement value ($d_1$). In some instances, the slope of the force versus displacement curve across first displacement range, the second displacement range, or both may not be perfectly linear. In such instances, to find the first and/or second slope, one should perform a least-squares fit using a piecewise linear function consisting of two or three linear pieces, with each linear piece having a standard error of regression (S) between a fitted linear function and experimental Stiffness Test results equal to 3.5% or less. Approximately 95% of the observations should fall within +/−2 times the standard error of the regression (S) from the regression line, which is also a quick approximation of a 95% prediction interval. For example, if S equals 3.5%, then 95% of the fitted data should fall within 7% of the real (measured) data. Graph 400 illustrates a fitted second linear slope ($m_2$), for example.

In other words, least-squares fit should be used to fit, piecewise, linear functions (lines) on the range of measured data. Piecewise means that not one, but two or three linear functions should be used to fit the data. The first linear function should approximate first part of the data (from a displacement of zero up to a first displacement value), the second linear function should be fitted from the first displacement value to a second displacement value, and so on.

Unless specified otherwise, the slope of the force versus displacement curve is measured in Meganewtons per meter (MN/m). Also unless specified otherwise, the Stiffness Test is performed on the same device at least three times and the results are averaged to determine the first and second linear slopes for the device.

In aspects, the first linear slope can be greater than the second linear slope. In aspects, the first linear slope can be at least two times greater than the second linear slope. In aspects, the first linear slope can be at least 10 times greater than the second linear slope. In aspects, the first linear slope can be at least 20 times greater than the second linear slope. In aspects, the first linear slope can be at least 30 times greater than the second linear slope. In aspects, the first linear slope can be at least 40 times greater than the second linear slope.

In aspects, the first linear slope can be less than or equal to 50 times the second linear slope. In aspects, the first linear slope can be less than or equal to 40 times the second linear slope. In aspects, the first linear slope can be less than or equal to 30 times the second linear slope. In aspects, the first linear slope can be less than or equal to 20 times the second linear slope. In aspects, the first linear slope can be less than or equal to 10 times the second linear slope.

The above-listed relationships between the first linear slope and the second linear slope can be combined to create a range defining the difference between the first linear slope and the second linear slope. For example, the first linear slope can be at least two times greater than the second linear slope and less than or equal to 50 times the second linear slope (i.e., $50*m_2 \geq m_1 \geq 2*m_2$). In aspects, the relationship between the first linear slope and the second linear slope can defined by any one of the following: $50*m_2 \geq m_1 \geq 2*m_2$; $50*m_2 \geq m_1 \geq 10*m_2$; $50*m_2 \geq m_1 \geq 20*m_2$; $50*m_2 \geq m_1 \geq 30*m_2$; $50*m_2 \geq m_1 \geq 40*m_2$; $40*m_2 \geq m_1 \geq 2*m_2$; $30*m_2 \geq m_1 \geq 2*m_2$; $20*m_2 \geq m_1 \geq 2*m_2$; or $10*m_2 \geq m_1 \geq 2*m_2$.

In aspects, the first linear slope can range from about 1.6 MN/m to about 1176 MN/m, including subranges. For example, in aspects, the first linear slope can range from about 1.6 MN/m to about 1176 MN/m, from about 1.6 MN/m to about 1000 MN/m, from about 1.6 MN/m to about 900 MN/m, from about 1.6 MN/m to about 800 MN/m, from about 1.6 MN/m to about 700 MN/m, from about 1.6 MN/m to about 600 MN/m, from about 1.6 MN/m to about 500 MN/m, from about 1.6 MN/m to about 400 MN/m, from about 1.6 MN/m to about 300 MN/m, from about 1.6 MN/m to about 200 MN/m, from about 1.6 MN/m to about 100 MN/m, from about 2 MN/m to about 1176 MN/m, from about 10 MN/m to about 1176 MN/m, from about 20 MN/m to about 1176 MN/m, from about 30 MN/m to about 1176 MN/m, from about 40 MN/m to about 1176 MN/m, from about 50 MN/m to about 1176 MN/m, from about 60 MN/m to about 1176 MN/m, from about 70 MN/m to about 1176 MN/m, from about 80 MN/m to about 1176 MN/m, from about 90 MN/m to about 1176 MN/m, or from about 100 MN/m to about 1176 MN/m, or within a range have any two of these values as endpoints.

In aspects, the first linear slope can range from about 2 MN/m to about 90 MN/m, including subranges. For example, in aspects, the first linear slope can range from about 2 MN/m to about 90 MN/m, from about 2 MN/m to about 80 MN/m, from about 2 MN/m to about 70 MN/m, from about 2 MN/m to about 60 MN/m, from about 2 MN/m to about 50 MN/m, from about 2 MN/m to about 40 MN/m, from about 2 MN/m to about 30 MN/m, from about 2 MN/m to about 20 MN/m, from about 2 MN/m to about 10 MN/m, from about 10 MN/m to about 90 MN/m, from about 20 MN/m to about 90 MN/m, from about 30 MN/to about 90 MN/m, from about 40 MN/m to about 90 MN/m, from about 50 MN/m to about 90 MN/m, from about 60 MN/m to about 90 MN/m, from about 70 MN/m to about 90 MN/m, or from about 80 MN/m to about 90 MN/m, or within a range have any two of these values as endpoints.

In aspects, the second linear slope can range from about 0.04 MN/m to about 37.5 MN/m, including subranges. For example, in aspects, the second linear slope can range from about 0.04 MN/m to about 37.5 MN/m, from about 0.04 MN/m to about 35 MN/m, from about 0.04 MN/m to about 30 MN/m, from about 0.04 MN/m to about 25 MN/m, from about 0.04 MN/m to about 20 MN/m, from about 0.04 MN/m to about 15 MN/m, from about 0.04 MN/m to about 10 MN/m, from about 0.04 MN/m to about 5 MN/m, from about 0.04 MN/m to about 1 MN/m, from about 0.1 MN/m to about 37.5 MN/m, from about 0.2 MN/m to about 37.5 MN/m, from about 0.3 MN/m to about 37.5 MN/m, from about 0.4 MN/m to about 37.5 MN/m, from about 0.5 MN/m to about 37.5 MN/m, from about 0.6 MN/m to about 37.5 MN/m, from about 0.7 MN/m to about 37.5 MN/m, from about 0.8 MN/m to about 37.5 MN/m, or from about 0.9 MN/m to about 37.5 MN/m, or within a range having any two of these values as endpoints.

In aspects, the second linear slope can range from about 0.5 MN/m to about 4.2 MN/m, including subranges. For example, in aspects, the second linear slope can range from about 0.5 MN/m to about 4.2 MN/m, from about 0.5 MN/m to about 4 MN/m, from about 0.5 MN/m to about 3.5 MN/m, from about 0.5 MN/m to about 3 MN/m, from about 0.5 MN/m to about 2.5 MN/m, from about 0.5 MN/m to about 2 MN/m, from about 1 MN/m to about 4.2 MN/m, from about 1.5 MN/m to about 4.2 MN/m, from about 2 MN/m to about 4.2 MN/m, from about 2.5 MN/m to about 4.2 MN/m, or from about 3 MN/m to about 4.2 MN/m, or within a range having any two of these values as endpoints.

In aspects, the first displacement value ($d_1$) in a force versus displacement curve measured according to the Stiffness Test can be less than or equal to about 0.45 mm. In aspects, the first displacement value ($d_1$) can range from about 0.01 mm to about 0.45 mm, including subranges. For example, in aspects, the first displacement value ($d_1$) can range from about 0.01 mm to about 0.45 mm, from about 0.01 mm to about 0.4 mm, from about 0.01 mm to about 0.35 mm, from about 0.01 mm to about 0.3 mm, from about 0.01 mm to about 0.25 mm, from about 0.01 mm to about 0.2 mm, from about 0.01 mm to about 0.15 mm, from about 0.01 mm to about 0.1 mm, from about 0.01 mm to about 0.075 mm, from about 0.01 mm to about 0.05 mm, from about 0.01 mm to about 0.025 mm, from about 0.025 mm to about 0.45 mm, from about 0.05 mm to about 0.45 mm, from about 0.075 mm to about 0.45 mm, from about 0.1 mm to about 0.45 mm, from about 0.15 mm to about 0.45 mm, from about 0.2 mm to about 0.45 mm, from about 0.25 mm to about 0.45 mm, from about 0.3 mm to about 0.45 mm, from about 0.35 mm to about 0.45 mm, or from about 0.4 mm to about 0.45 mm, or within a range having any two of these values as endpoints.

In aspects, the first displacement value ($d_1$) in a force versus displacement curve measured according to the Stiffness Test can be less than or equal to about 0.3 mm. In aspects, the first displacement value ($d_1$) can range from about 0.01 mm to about 0.3 mm, including subranges. For example, in aspects, the first displacement value ($d_1$) can range from about 0.01 mm to about 0.3 mm, from about 0.01 mm to about 0.25 mm, from about 0.01 mm to about 0.2 mm, from about 0.01 mm to about 0.1 mm, from about 0.05 mm to about 0.3 mm, from about 0.1 mm to about 0.3 mm, from about 0.15 mm to about 0.3 mm, from about 0.2 mm to about 0.3 mm, or from about 0.25 mm to about 0.3 mm, or within a range having any two of these values as endpoints.

In aspects, the second displacement value ($d_2$) in a force versus displacement curve measured according to the Stiffness Test can range from about 0.5 mm to about 1.5 mm, including subranges. For example, in aspects, the second displacement value ($d_2$) can range from about 0.5 mm to about 1.5 mm, from about 0.5 mm to about 1.4 mm, from about 0.5 mm to about 1.3 mm, from about 0.5 mm to about 1.2 mm, from about 0.5 mm to about 1.1 mm, from about 0.5 mm to about 1 mm, from about 0.5 mm to about 0.9 mm, from about 0.5 mm to about 0.8 mm, from about 0.5 mm to about 0.7 mm, from about 0.6 mm to about 1.5 mm, from about 0.7 mm to about 1.5 mm, from about 0.8 mm to about 1.5 mm, from about 0.9 mm to about 1.5 mm, from about 1 mm to about 1.5 mm, from about 1.1 mm to about 1.5 mm, from about 1.2 mm to about 1.5 mm, or from about 1.3 mm to about 1.5 mm, or within a range having any two of these values as endpoints. In aspects, the second displacement value ($d_2$) can be about 1 mm. In aspects, the second displacement value ($d_2$) can range from about 0.9 mm to about 1.1 mm or from about 0.75 mm to about 1.25 mm.

Figure 5:
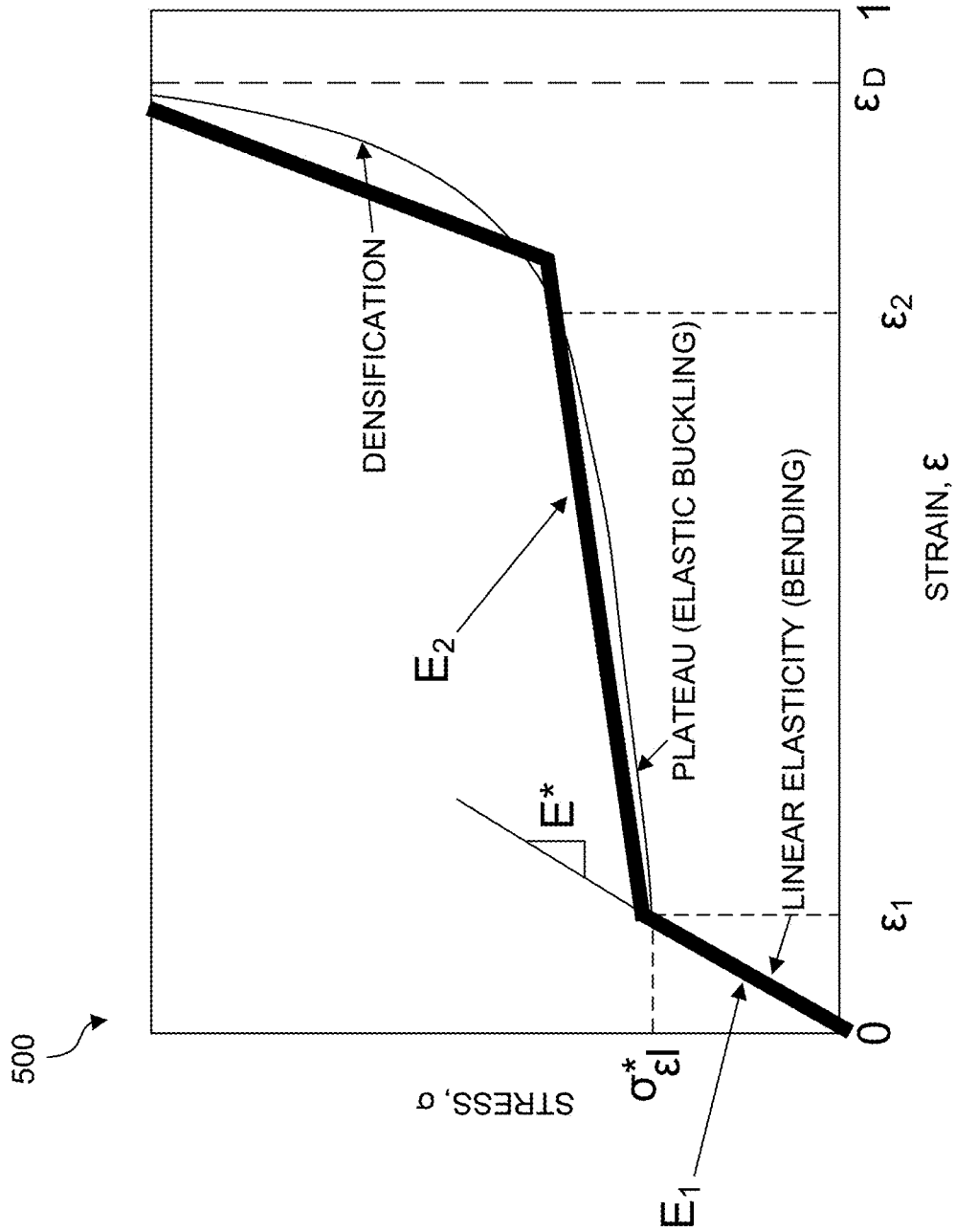
FIG. 5 is a graph illustrating a bilinear elastic modulus in compression according to aspects.

In aspects, the bilinear elastic modulus in compression for structure 140 comprises a first elastic modulus in compression ($E_1$) measured over a first strain range from zero strain ($\varepsilon_0$) to a first strain value ($\varepsilon_1$) and a second elastic modulus in compression ($E_2$) measured over a second strain range from the first strain value ($\varepsilon_1$) to a second strain value ($\varepsilon_2$) greater than the first strain value ($\varepsilon_1$). Graph 500 in FIG. 5 illustrates a bilinear elastic modulus in compression according to aspects.

In aspects, the first elastic modulus in compression ($E_1$) can be greater than the second elastic modulus in compression ($E_2$). In aspects, the first elastic modulus in compression can be at least two times greater than the second elastic modulus in compression. In aspects, the first elastic modulus in compression can be at least 50 times greater than the second elastic modulus in compression. In aspects, the first elastic modulus in compression can be at least 100 times greater than the second elastic modulus in compression. In aspects, the first elastic modulus in compression can be at least 500 times greater than the second elastic modulus in compression. In aspects, the first elastic modulus in compression can be at least 1000 times greater than the second elastic modulus in compression. In aspects, the first elastic modulus in compression can be at least 1500 times greater than the second elastic modulus in compression. In aspects, the first elastic modulus in compression can be at least 2000 times greater than the second elastic modulus in compression.

In aspects, the first elastic modulus in compression can be less than or equal to 2400 times the second elastic modulus in compression. In aspects, the first elastic modulus in compression can be less than or equal to 2000 times the second elastic modulus in compression. In aspects, the first elastic modulus in compression can be less than or equal to 1500 times the second elastic modulus in compression. In aspects, the first elastic modulus in compression can be less than or equal to 1000 times the second elastic modulus in compression. In aspects, the first elastic modulus in compression can be less than or equal to 500 times the second elastic modulus in compression. In aspects, the first elastic modulus in compression can be less than or equal to 100 times the second elastic modulus in compression. In aspects, the first elastic modulus in compression can be less than or equal to 50 times the second elastic modulus in compression.

The above-listed relationships between the first elastic modulus in compression and the second elastic modulus in compression can be combined to create a range defining the difference between the first elastic modulus in compression and the second elastic modulus in compression. For example, the first elastic modulus in compression can be at least two times greater than the second elastic modulus in compression and less than or equal to 2400 times the second elastic modulus in compression (i.e., $2400*E_2 \geq E_1 \geq 2*E_2$). In aspects, the relationship between the first elastic modulus in compression and the second elastic modulus in compression can defined by any one of the following: $2400*E_2 \geq E_1 \geq 2*E_2$; $2400*E_2 \geq E_1 \geq 50*E_2$; $2400*E_2 \geq E_1 \geq 100*E_2$; $2400*E_2 \geq E_1 \geq 500*E_2$; $2400*E_2 \geq E_1 \geq 1000*E_2$; $2400*E_2 \geq E_1 \geq 1500*E_2$; $2400*E_2 \geq E_1 \geq 2000*E_2$; $2000*E_2 \geq E_1 \geq 2*E_2$; $1500*E_2 \geq E_1 \geq 2*E_2$; $1000*E_2 \geq E_1 \geq 2*E_2$; $500*E_2 \geq E_1 \geq 2*E_2$; $100*E_2 \geq E_1 \geq 2*E_2$; or $50*E_2 \geq E_1 \geq 2*E_2$.

Unless specified otherwise, the elastic moduli in compression for a material are measured using ASTM D1621, modified as follows. Instead of 13% deformation with respect to specimen height, deformation should be 60-70% of the specimen height in order to properly capture the whole range of moduli. Unless specified otherwise, the elastic moduli of a material are tested at least three times and the results are averaged to determine the first and second elastic moduli in compression.

Also unless specified otherwise, the first and second elastic moduli are measured according to the methodology for calculating Segment Modulus. In this methodology, one selects a start strain point and an end strain point. Then, using a least-squares fit on all points between the start and end points, a line is constructed. The slope of the least-squares fit line is reported as the modulus.

To find the first and/or second elastic modulus in compression, one should perform a fit using a piecewise linear function consisting of two or three linear pieces, with each linear piece having a standard error of regression (S) between a fitted linear function and experimental elastic moduli testing results of equal to 3.5% or less. Approximately 95% of the observations should fall within +/−2 times the standard error of the regression (S) from the regression line, which is also a quick approximation of a 95% prediction interval. For example, if S equals 3.5%, then 95% of the fitted data should fall within 7% of the real (measured) data. Graph 500 in FIG. 5 illustrates a fitted second elastic modulus in compression ($E_2$), for example. Unless specified otherwise, the first and second elastic moduli in compression are measured in pascals.

In other words, least-squares fit should be used to fit, piecewise, linear functions (lines) on the whole range of measured data. Piecewise means that not one, but two or three linear functions should be used to fit the data. The first linear function should approximate first part of the data, from a strain of zero up to a strain at which measured stress stops increasing. The second linear function should be fitted from the point where stress stops increasing linearly up to selected second strain, for example a point where a steep stress increase can be observed again. For example, graph 500 shows a first linear function line from zero strain up to a strain equal to $\varepsilon_1$ and a second linear function line from the strain equal to $\varepsilon_1$ up to a strain equal to $\varepsilon_2$. In some cases, a third linear function can be used to approximate a third elastic modulus after the steep stress increase. For example, graph 500 shows a third linear function line from the strain equal to $\varepsilon_2$ up to a strain equal to $\varepsilon_D$. Each of the linear functions obtained by the least-squares fits should have standard error of regression equal to 3.5% or less.

Exemplary mechanical structures for structure 140 include, but are not limited to a foam, bistable beams, springs, or honeycomb structures. Example materials for structure 140 include, but are not limited to a foam material or a shape memory alloy, for example Nitinol.

In aspects, the foam material can be an elastomeric foam. Deformation of an elastomeric foam is accompanied by buckling of cell walls, which leads to stiffness reduction followed by force reduction and energy absorption. A suitable elastomeric foam is a polyethylene foam comprising an initial elastic modulus of 53 MPa, a 2% elastic limit, a 20% fraction of solid material contained in cell faces, a polyurethane having an elastic modulus of 0.2 GPa, a cell density of 910 kg/m$^3$, and a 50% density ratio of cell structure.

In aspects, the bistable beams can be double-beams capable of buckling elastically. In aspects, a honeycomb structure can be made by connecting bistable double-beam structures.

In aspects, the springs can be disc springs. Disk springs can be thin metal plates of a uniform or variable thickness having a dome shape. In aspects, the disk springs can be stacked, in series or in parallel, to achieve desired impact force mitigation. In aspects, the springs can be conical spring washers. In aspects, the springs can be flat springs. The number and position of the disk springs, conical spring washers, or flat springs within structure 140 can be designed to achieve desired bilinear elastic properties in compression, and thus desired impact force mitigation.

The ability of structures according to aspects described herein to effectively mitigate impact forces is demonstrated through the following computational models.

Figure 6:
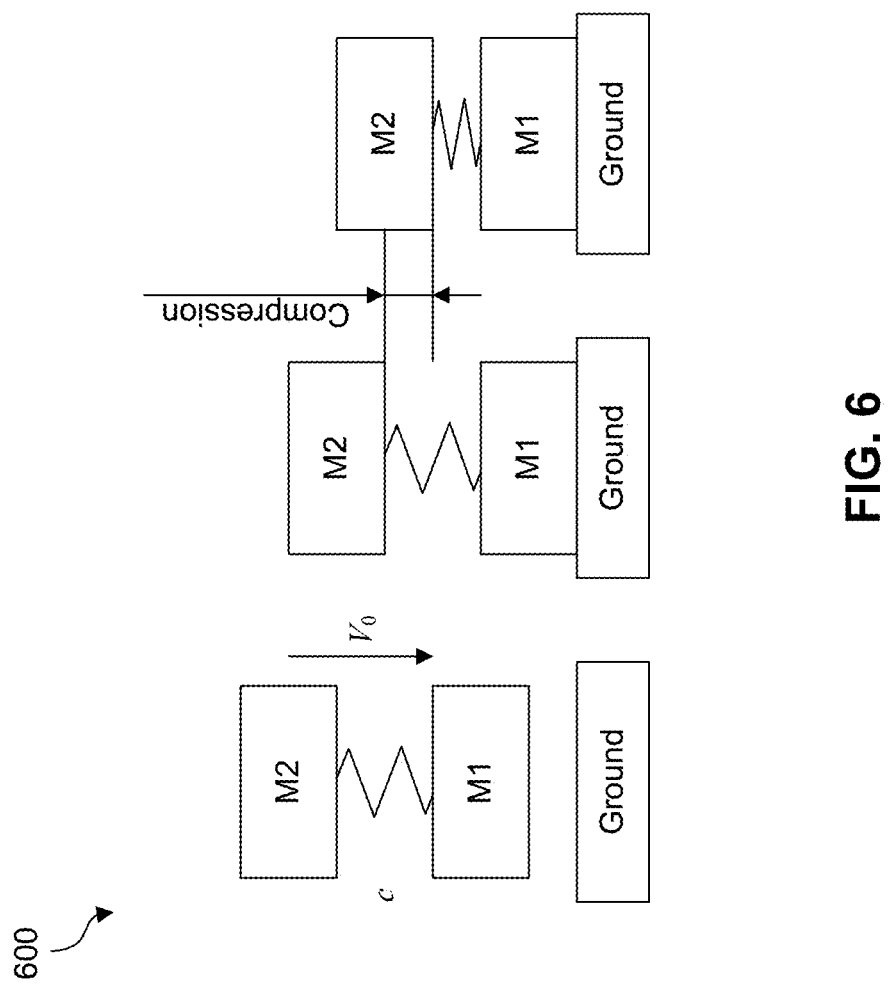
FIG. 6 illustrates a double mass model.

FIG. 6 shows a simplified model 600 made from two masses (M1 and M2) connected by spring (c). These masses simulate a cover glass layer and the rest of a consumer electronic device (for example, a smartphone), respectively. In the model, the spring simulates a linear elastic response in compression and a bilinear elastic response in compression. The spring modeled a linear elastic response in compression when it was given a constant stiffness across all displacement values. The spring modeled a bilinear elastic response in compression when it was given two different stiffness values across different displacement ranges. In particular, the spring was given a first compressive stiffness value across a first displacement range and a second compressive stiffness value across a second displacement range. For the model, the first compressive stiffness value was greater than the second compressive stiffness value.

Figure 7B:
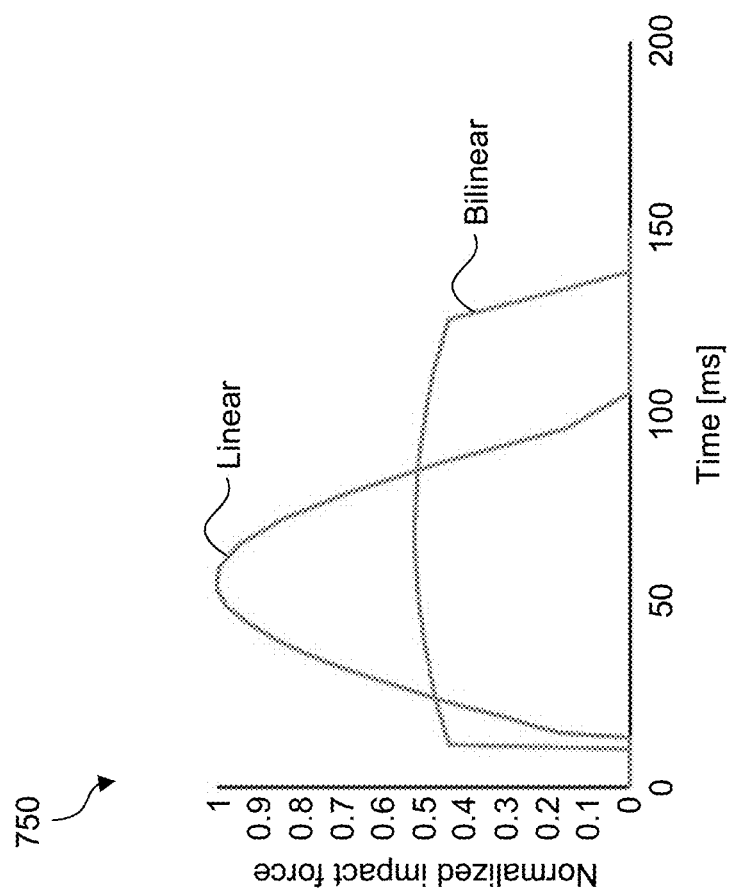
FIG. 7B is a graph illustrating the normalized impact force versus time for the double mass model.
Figure 7A:
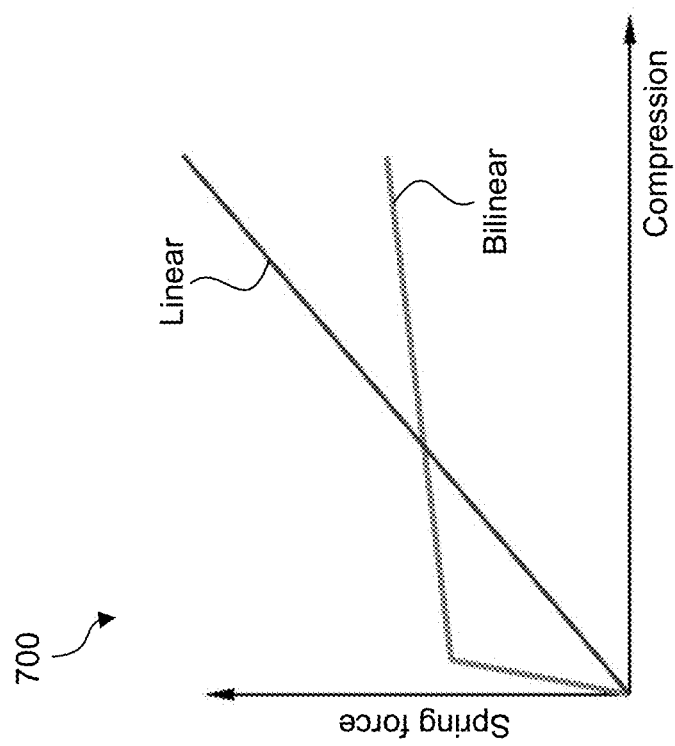
FIG. 7A is a graph illustrating the spring force versus compression for a double mass model.

To show the influence of the linear and bilinear spring responses, dynamic simulation was performed in LS DYNA explicit solver software. Graphs 700 and 750 in FIGS. 7A and 7B show the spring response to simulated load and an impact force during drop event. As shown in graph 750, the maximum impact force during the drop event is reduced by about 50% for the spring modeled as having a bilinear elastic response in compression. This can be explained in terms of energy required to deform the spring. During the simulated impact event, the spring is compressing and accumulating deformational energy. The spring modeled with a linear elastic response in compression accumulates energy while increasing force in the spring. On the other hand, the spring modeled with a bilinear elastic response in compression can accumulate the same amount of energy at a lower amount of force in the spring. This difference in force accumulated is shown as area under the curves labeled "linear" and "bilinear" in graph 700.

Figure 8:
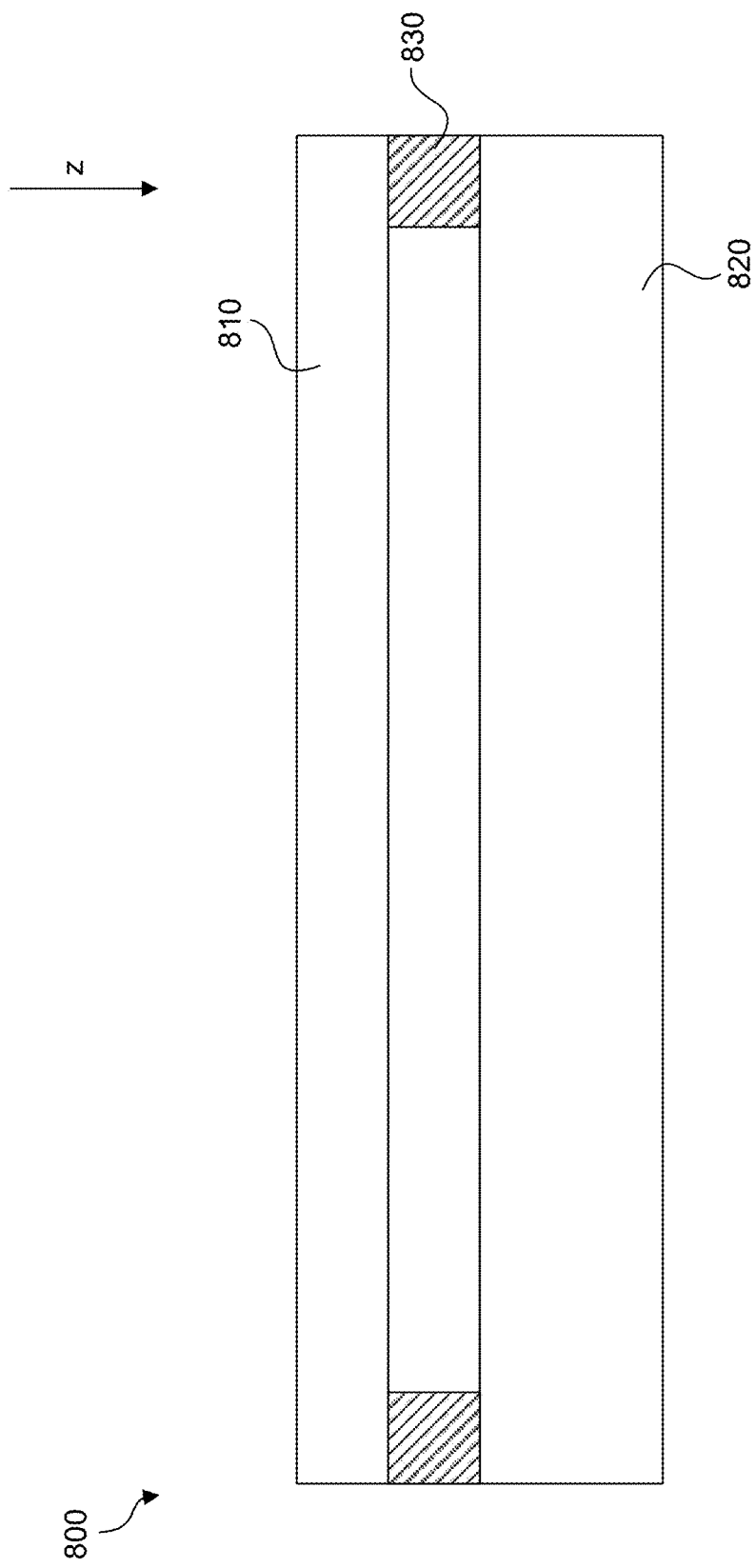
FIG. 8 illustrates a schematic configuration of a device used for a FEM (finite element modeling) numerical modeling.

To demonstrate the effectiveness of structures according to aspects described herein the following finite element modeling (FEM) using LS DYNA software was performed. A schematic of a simplified FEM model 800 representing a consumer electronic device is shown FIG. 8. The model 800 included a modeled cover glass layer 810, a modeled support 820 in the form of a plate having mass and stiffness properties of a typical smartphone housing, and a frame 830 modeled as a solid orthotropic material having a low stiffness in the Z direction and having embedded springs responsible for compressional behavior (both linearly elastic compressive behavior and bilinearly elastic compressive behavior). Low stiffness in Z direction was modeled so that the embedded springs took on all the compressive load while shear deformation was transferred through the frame 830. The orthotropic structure and frame shape were important for the stability of the model 800 during inclined drop tests because springs do not carry load in transverse directions and as such would not prevent any lateral motion between cover glass layer 810 and support 820.

Cover glass layer 810 was modeled as a linear elastic material with following properties: Density=1200 kg/m$^3$, Elastic modulus=23 GPa, and Poisson's coefficient=0.21.

Support 820 was modeled as a linear elastic material with following properties: Density=2369.3 kg/m$^3$, Elastic modulus=1.46 GPa, and Poisson's coefficient=0.3.

Frame 830 having a linear elastic response in compression was modeled as having two structures—660 linearly elastic springs and an orthotropic elastic frame. Each linear elastic spring had stiffness k=11.2 kN/m (kilonewton per meter). The total compressive stiffness of the springs was equal to the sum of the stiffness of each spring molded. The orthotropic frame had following properties: Elastic modulus in the Z direction=100 Pa, Elastic modulus in a plane orthogonal to Z direction=10 MPa, and Shear modulus in all directions=10 MPa.

Frame 830 having a bilinear elastic response in compression was modeled as having two structures—660 bilinear elastic springs and an orthotropic elastic frame. Each bilinear elastic spring had a stiffness k1=0.56 MN/m to a displacement of 0.08 mm and a stiffness k2=63 N/m in the displacement range from 0.08 mm to 0.8 mm. The total compressive stiffness of the springs was equal to the sum of the stiffness of each spring molded. The orthotropic frame had following properties: Elastic modulus in the Z direction=100 Pa, Elastic modulus in a plane orthogonal to Z direction=10 MPa, and Shear modulus in all directions=10 MPa.

Figure 9:
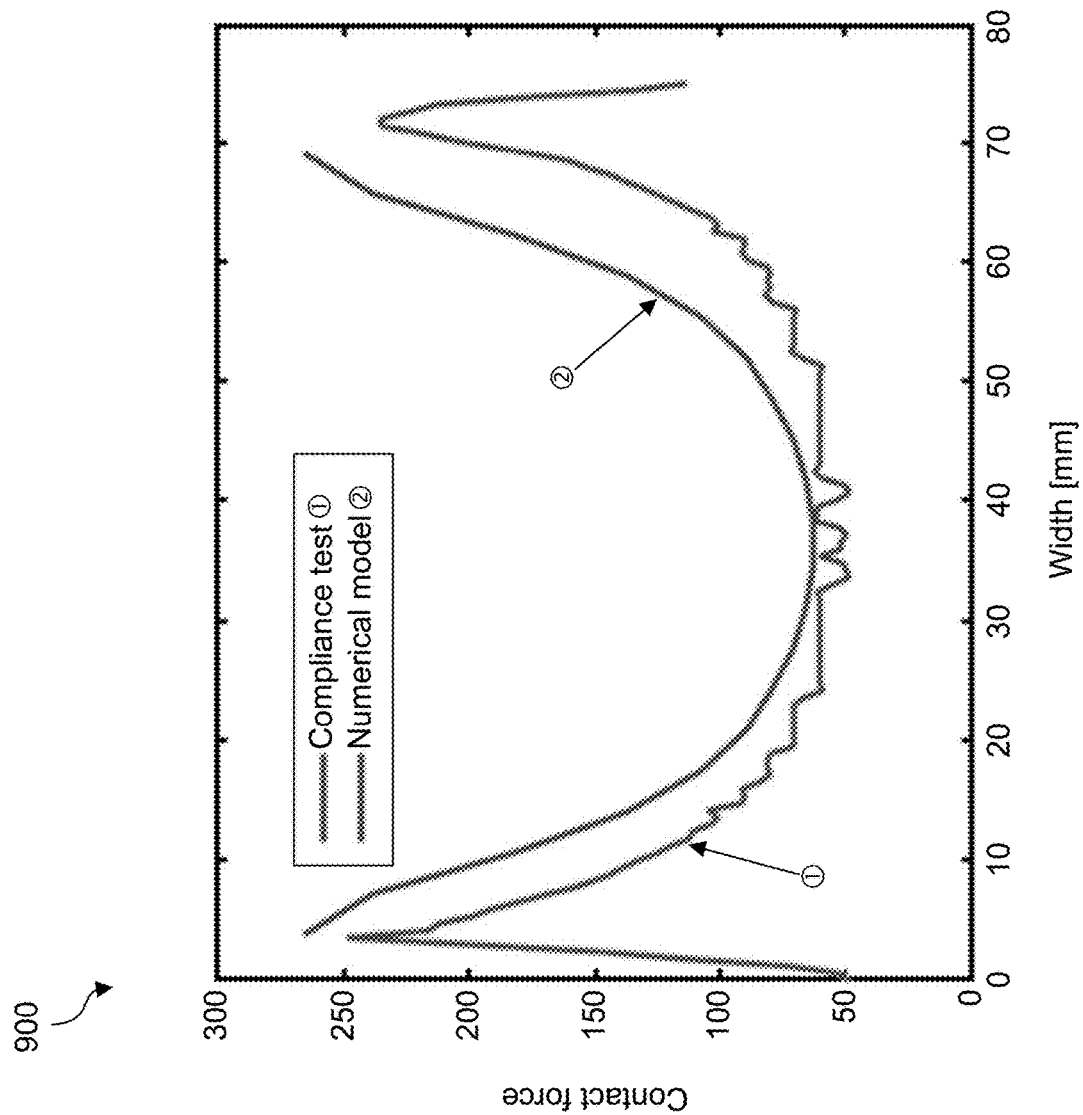
FIG. 9 is a graph showing a comparison between the contact force distribution from an experiment and the contact force distribution for a FEM numerical model.

Graph 900 in FIG. 9 shows the contact force distribution along the middle of the model 800. Displacement was applied along the middle of the model 800 and experimental contact force was obtained. Then, the numerical model 800 was calibrated to have same or similar contact forces to the same displacement value along the middle of the model 800. Graph 900 shows a comparison between experimentally measured and numerically obtained contact forces along the middle of the model. The contact force measured from the applied displacement in model 800 is labeled #2 in graph 900. The contact force in model 800 was calibrated to match the contact force distribution along the width of an actual cover glass layer observed experimentally during a bend test. The experimentally observed force distribution is labeled #1 in graph 900. These results (experimental and numerical) represent cover glass and electronic display stiffness and as such should hold for both the face drop and inclined drop test simulations described below. By calibrating the model in this way, results for the FEM model should accurately reflect results performed on an actual device.

Device face drop simulation was performed using the model 800 for both the frame 830 having a linear elastic response in compression and the frame 830 having a bilinear elastic response in compression. Face drop simulation was performed by placing the model in free fall at the start of the simulation with the initial velocity calculated from drop height ($v=\sqrt{2*g*h}$), where: v represents initial velocity, h is drop height, and g is gravitational acceleration. Device contact with the ground was modeled when the drop height, h, reached zero, and the resulting forces applied to the model were measured. The initial orientation of the device in the face drop simulation was zero degrees (i.e., with the modeled device oriented parallel to the ground).

Figure 10:
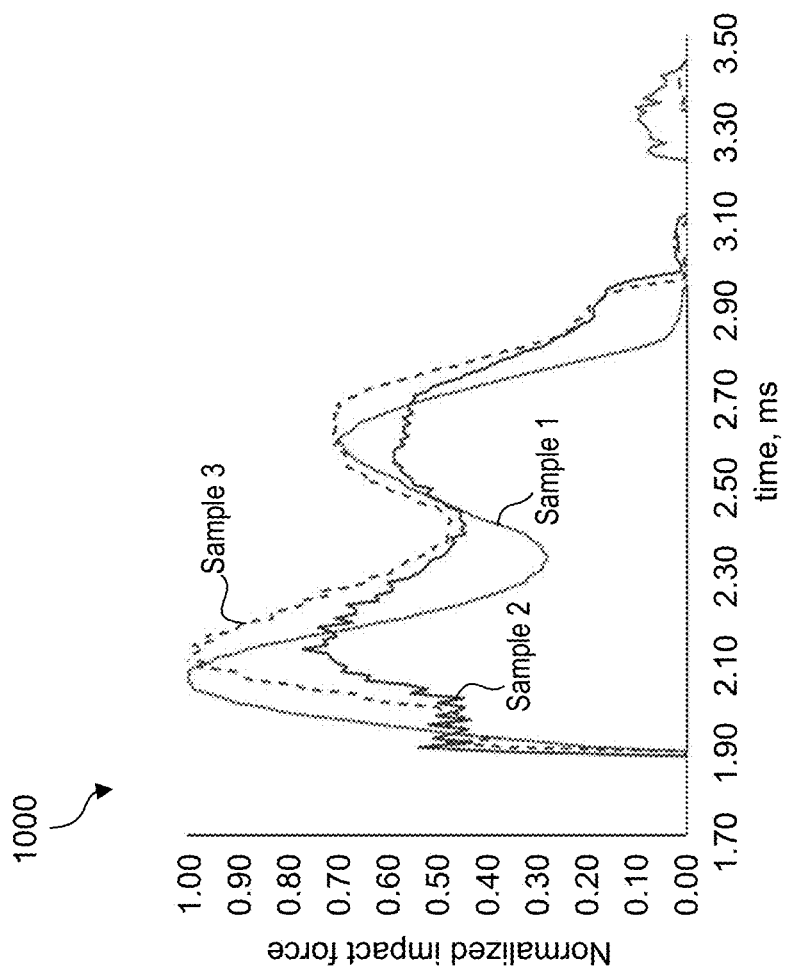
FIG. 10 is a graph illustrating the mechanical response of a frame modeled with linear and bilinear elastic properties in a FEM face drop simulation.

Graph 1000 in FIG. 10 shows the impact forces generated during drop event for three modeled sample cases. Sample 1 shows the response of the frame 830 having a linear elastic response in compression at a 144 cm drop height. Sample 2 shows the response of the frame 830 having the bilinear elastic response in compression at a 144 cm drop height. Sample 3 shows the response of the frame 830 having the bilinear elastic response in compression at a 200 cm drop height. Graph 1000 shows a reduction in maximum force up to 30% when the frame 830 having the bilinear elastic response (Sample 2) according to aspects of the present application was modeled (compare Sample 1—linear elastic response). The results of the model 800 also show that the drop height can be increased by about 25% when using the frame 830 having the bilinear elastic response (Sample 3—200 cm drop height) while maintaining the same level of maximum force as the frame 830 having a linear elastic response in compression (compare Sample 1—144 cm drop height).

To further test the effectiveness of the frame 830 with the bilinear elastic response in compression an inclined drop test simulation (10-degree angles with respect to opposing edges of model 800) was performed. Inclined drop simulation was performed by placing the model in free fall at the start of the simulation with the initial velocity calculated from drop height ($v=\sqrt{2*g*h}$), where: v represents initial velocity, h is drop height, and g is gravitational acceleration. Device contact with the ground was modeled when the drop height, h, reached zero, and the resulting forces applied to the model were measured. The initial orientation of the device in the inclined drop simulation was a tilt of 10 degrees across the top surface of the cover glass layer 810, relative to the ground. The tilt of 10 degrees was created by two successive rotations of the model, a first rotation around X axis by 10 degrees and then second rotation around Y axis by 10 degrees. The results of this simulation are shown in FIGS. 11A-14.

Figure 11A:
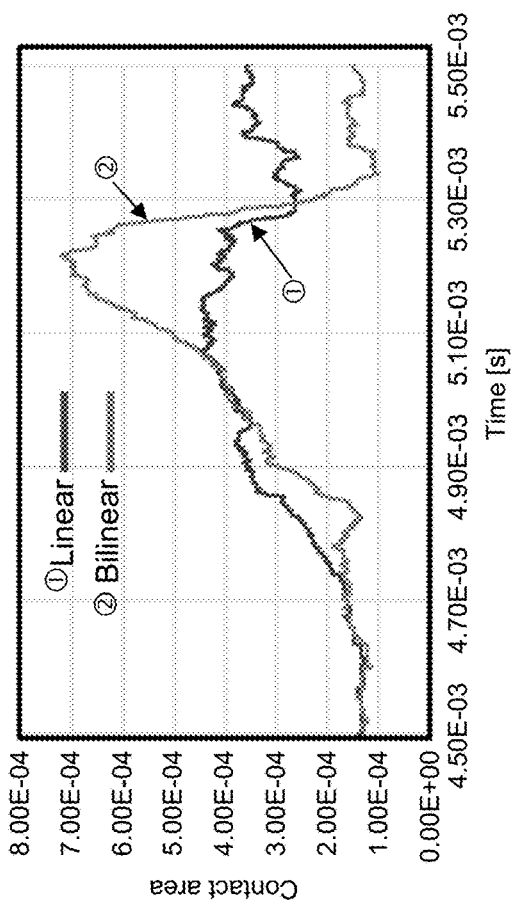
FIG. 11A is a graph illustrating integral contact force versus time for a FEM inclined drop test.
Figure 11B:
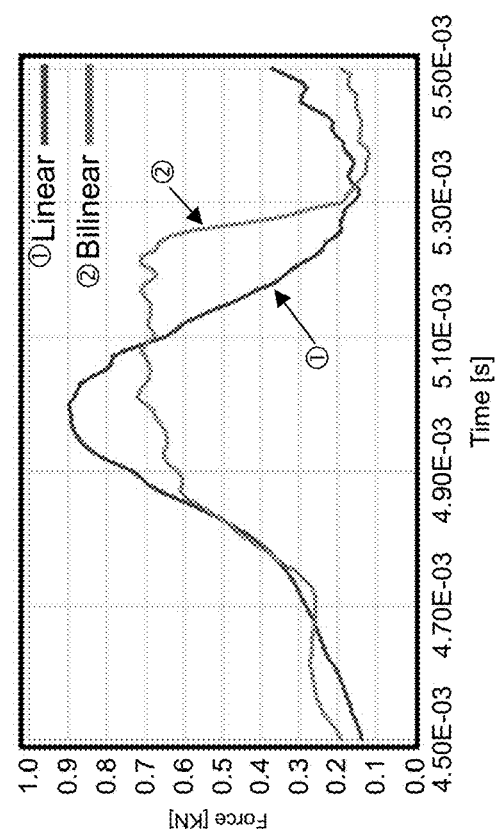
FIG. 11B is a graph illustrating integral contact area versus time for the FEM inclined drop test.

The graphs 1100 and 1150 in FIGS. 11A and 11B show the integral contact forces (graph 1100) and the corresponding contact area (graph 1150) during the inclined drop event for both the linear and bilinear frame 830. The results show that impact force for the bilinear response reached a plateau that had a value about 23% less than the maximum contact force for the linear response. This was accompanied by an increase in overall contact area during the drop event. Graphs 1100 and 1150 show that the device modeled with the bilinear frame 830 was more compliant, and thus more area was in contact with the applied forces, which lowered overall maximum impact force.

Figure 12A:
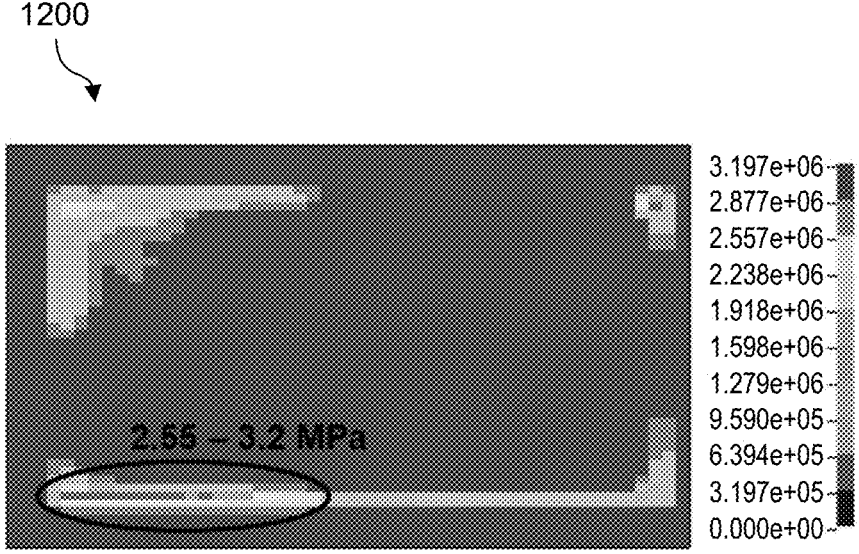
FIG. 12A is a graph illustrating the contact pressure for a device modeled with a frame having a linear elastic property in compression in the FEM inclined drop test.
Figure 12B:
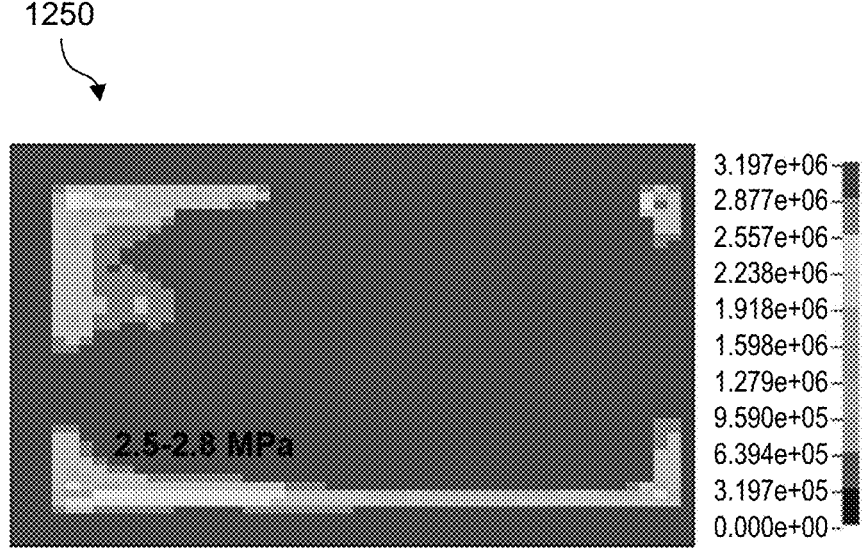
FIG. 12B is a graph illustrating the contact pressure for a device modeled with frame having a bilinear elastic property in compression in the FEM inclined drop test.

Graphs 1200 and 1250 in FIGS. 12A and 12B show the maximum contact pressure distribution throughout the inclined drop event for the frame 830 having the linear elastic response in compression and the frame 830 having the bilinear elastic response in compression, respectively. As shown in graphs 1200 and 1250, the impact location at the lower left corner for the bilinear frame 830 had a reduction of maximum contact pressures of up to about 12.5%. In addition, the whole contact area showed significant reduction in contact pressures for the bilinear frame 830, compared to the linear frame 830.

Figure 13A:
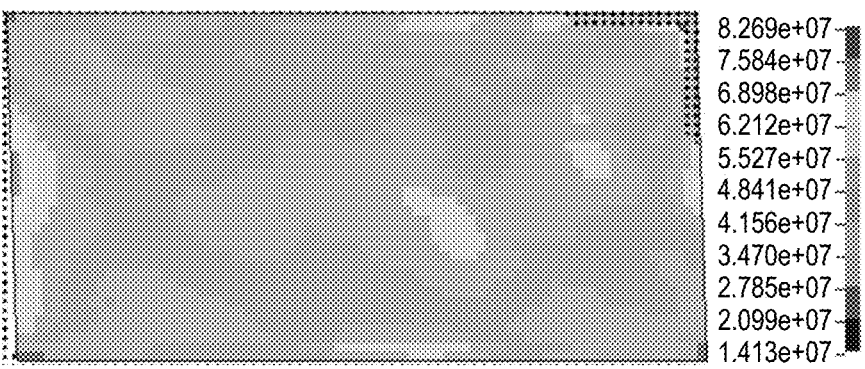
FIG. 13A is a graph illustrating the maximum principle stress for a device modeled with a frame having a linear elastic property in compression in the FEM inclined drop test.
Figure 13B:
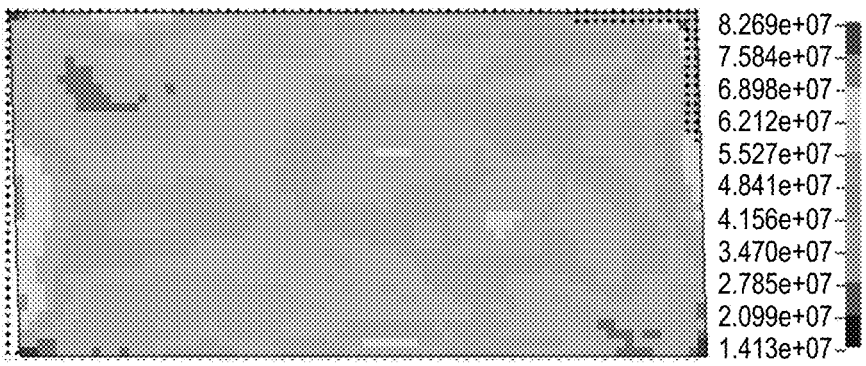
FIG. 13B is a graph illustrating the maximum principle stress for a device modeled with frame having a bilinear elastic property in compression in the FEM inclined drop test.

Graphs 1300 and 1350 in FIGS. 13A and 13B show the maximum principal stress distribution throughout the inclined drop event for the frame 830 having the linear elastic response in compression and the frame 830 having the bilinear elastic response in compression, respectively. As shown in graphs 1300 and 1350, the maximum stresses was essentially the same for both frames. However, the overall distribution of stresses showed that there were lower stresses for the bilinear frame indicated by more dark gray areas in graph 1350, which represent lower stresses. Graphs 1300 and 1350 indicated that, in the case of the bilinear frame response, the cover glass layer 810 was deforming less strongly compared to the linear frame response.

Figure 14:
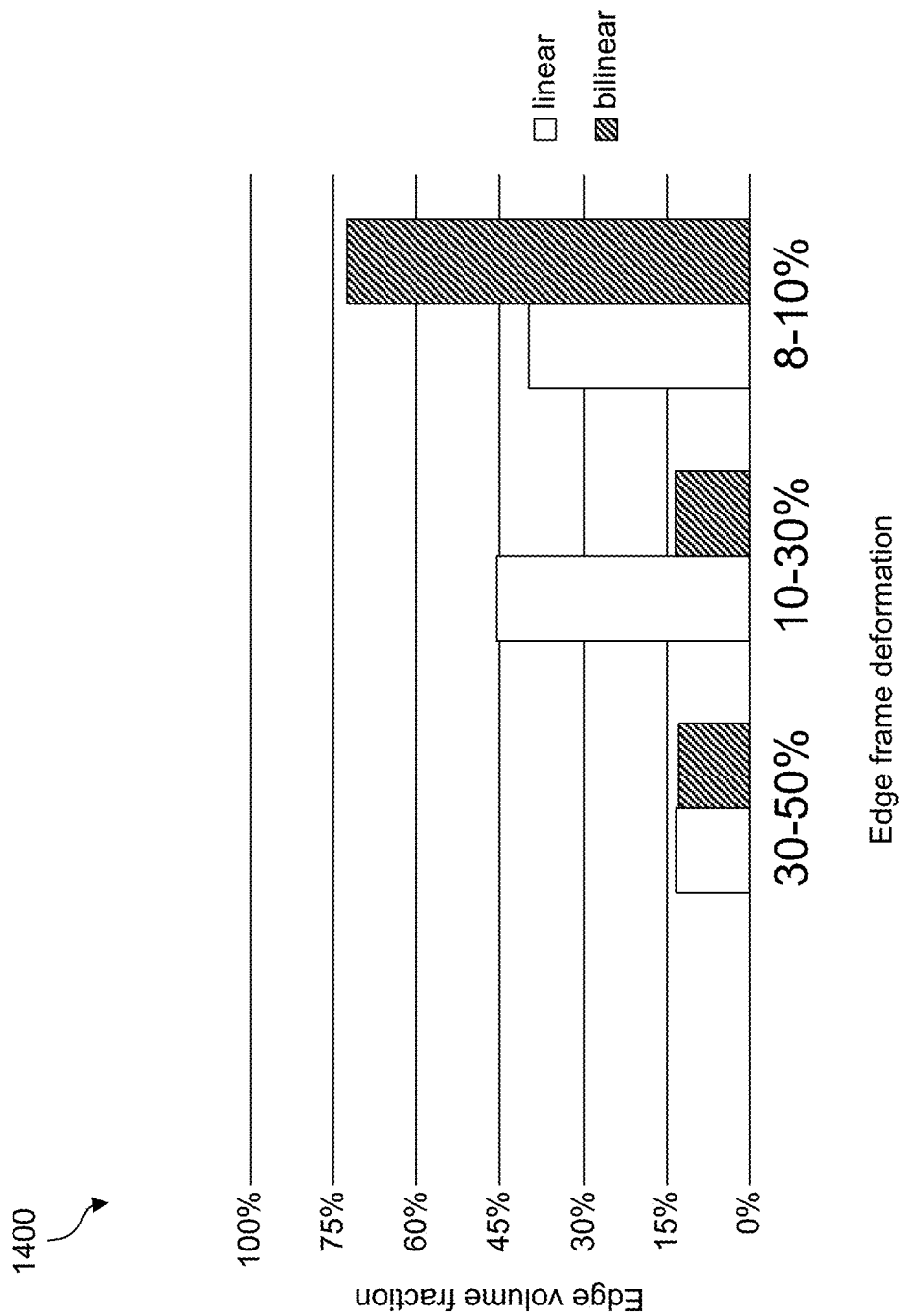
FIG. 14 is a bar graph showing edge deformation in terms of edge volume fraction for devices modeled with the linear and bilinear frames in the FEM inclined drop test.

The results shown in graphs 1300 and 1350 were further confirmed by the edge frame deformation shown in graph 1400 of FIG. 14. On graph 1400, deformation of the edge of the frame 830 for both the linear and bilinear responses is shown. For the bilinear response, most of the edge was deformed in the range from 8% to 10%. In contrast, for the linear response, edge deformations were spread almost equally between 8-10% and 10-30%.

Face drop simulation with small angles (1-degree angles with respect to both edges of model 800) were also performed. Face drop simulation at small angles was performed by placing the model in free fall at the start of the simulation with the initial velocity calculated from drop height ($v=\sqrt{2*g*h}$), where: v represents initial velocity, h is drop height, and g is gravitational acceleration. Device contact with the ground was modeled when the drop height, h, reached zero, and the resulting forces applied to the model are measured. The initial orientation of the device in the small angle face drop simulation was a tilt of 1 degree across the top surface of the cover glass layer 810, relative to the ground. The tilt of 1 degree was created by two successive rotations of the model, a first rotation around X axis by 1 degree and then second rotation around Y axis by 1 degree. The results of this simulation are shown in FIGS. 15A-17.

Figure 15A:
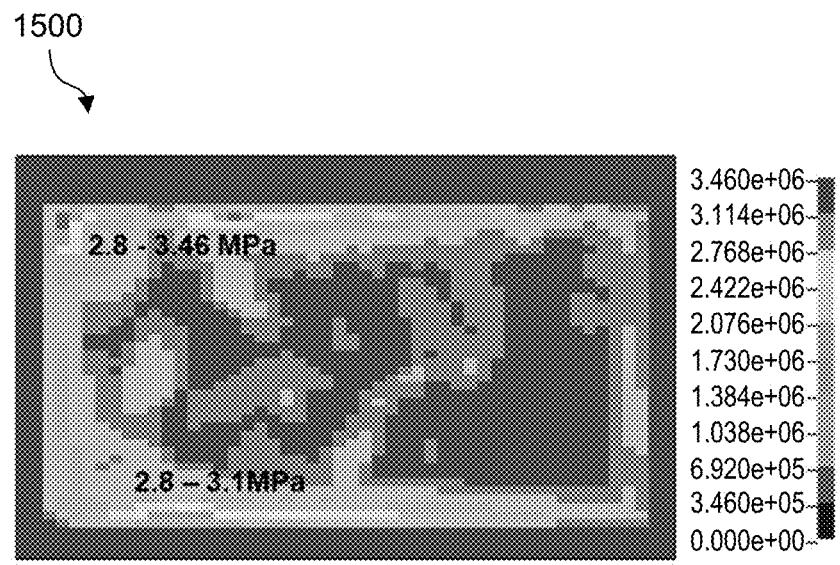
FIG. 15A is a graph illustrating the contact pressure for a device modeled with a frame having a linear elastic property in compression in a FEM face drop test.
Figure 15B:
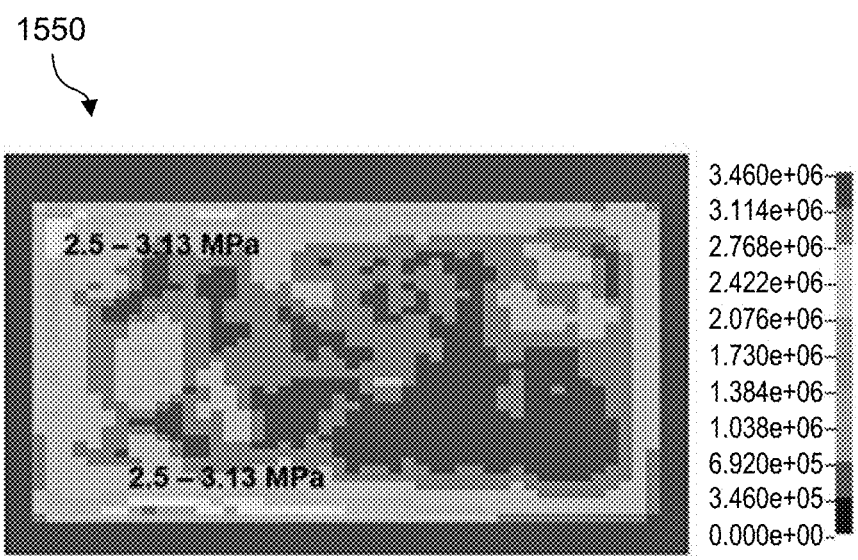
FIG. 15B is a graph illustrating the contact pressure for a device modeled with a frame having a bilinear elastic property in compression in the FEM face drop test.

Graphs 1500 and 1550 in FIGS. 15A and 15B show the maximum contact pressure distribution throughout the face drop simulation for the frame 830 having the linear elastic response in compression and the frame 830 having the bilinear elastic response in compression, respectively. As shown in graphs 1500 and 1550, the impact location at the upper left corner for the bilinear frame 830 had a reduction of maximum contact pressures of up to about 10%.

Figure 16A:
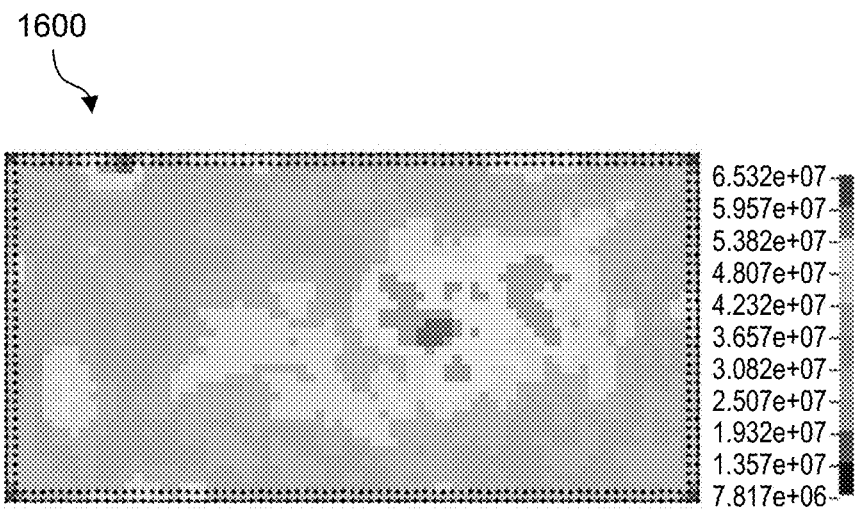
FIG. 16A is a graph illustrating the maximum principal stress for a device modeled with a frame having a linear elastic property in compression in the FEM face drop test.
Figure 16B:
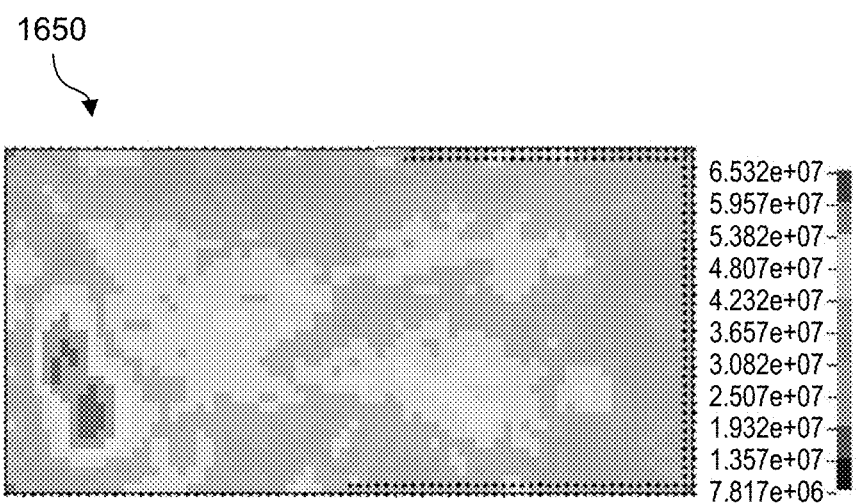
FIG. 16B is a graph illustrating the maximum principal stress for a device modeled with a frame having a linear elastic property in compression in the FEM face drop test.
Figure 17:
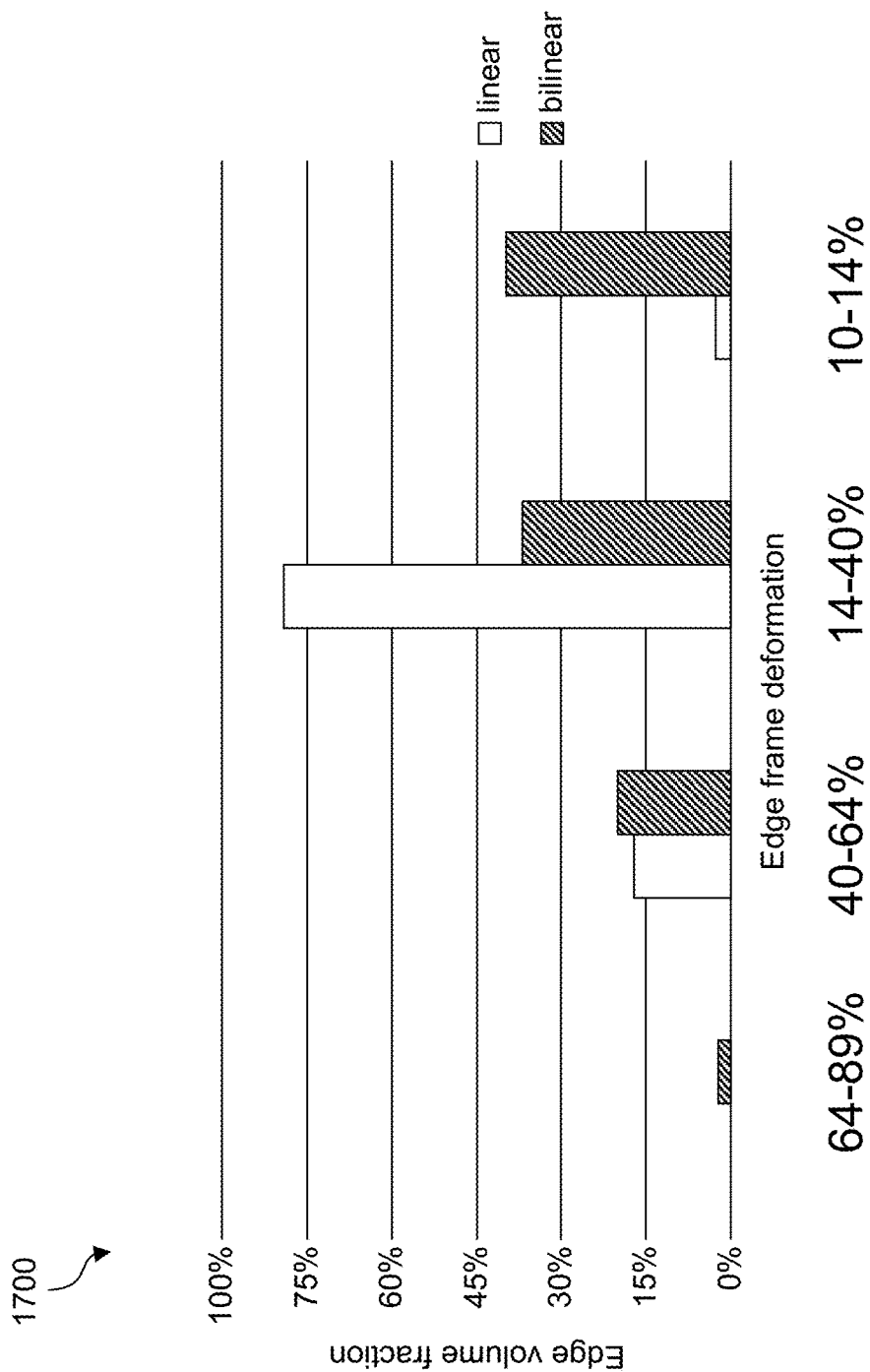
FIG. 17 is a bar graph showing edge deformation in terms of edge volume fraction for devices modeled with the linear and bilinear frames in the FEM face drop test.

Graphs 1600 and 1650 in FIGS. 16A and 16B show the maximum principal stress distribution throughout the face drop simulation for the frame 830 having the linear elastic response in compression and the frame 830 having the bilinear elastic response in compression, respectively. As shown in graphs 1600 and 1650, the maximum stresses were essentially the same for both frames. However, the overall distribution of stresses was different. The difference in overall stress distribution was different because overall device behavior was different for the two devices and different parts of the devices impacted the ground during the simulated drop event, which is evident in the bar graph 1700 in FIG. 17. A similar trend was observed as in the inclined drop simulation where a lot of edge frame volume was deformed in lower ranges, from 10-14%. Graph 1700 indicates a more even distribution of edge deformation for the frame 830 modeled as having the bilinear elastic response in compression, compared to the frame modeled as having the linear elastic response in compression.

Table 1 below summarizes the results of the face drop simulation and the inclined drop simulation. As evident in the results, structures comprising a bilinear elastic property in compression according to aspects described herein lead to an overall reduction in contact pressures without an increase in cover glass stresses. Further, deformations of frame edge are spread out, but not increased. Contact pressures are important indicator of cover glass layer survivability because they are correlated to the sharp damage introduction failure mode of glass, while maximum principal stresses are responsible for glass breaking in bending. Frame deformation during device collision with the ground is also an important indicator of how well a cover glass layer will behave. Large deformation of the frame edge could lead to a cover glass layer contacting inner structures of the device, which can lead to damage of the cover glass layer.

TABLE 1

Comparison Between Frames Modeled with Linear Elastic and Bilinear Elastic Responses

| Output | Face Drop Simulation |
|---|---|
| Contact force | No significant change |
| Contact pressure | −10% (improvement for bilinear) |
| Maximum stress | No significant change |
| Edge Deformation | Spread throughout frame (improvement for bilinear) |

| Output | Inclined Drop Simulation |
|---|---|
| Contact force | −23% (improvement for bilinear) |
| Contact pressure | −12.5% (improvement for bilinear) |
| Maximum stress | No significant change |
| Edge Deformation | Spread throughout frame (improvement for bilinear) |

Figure 18B:
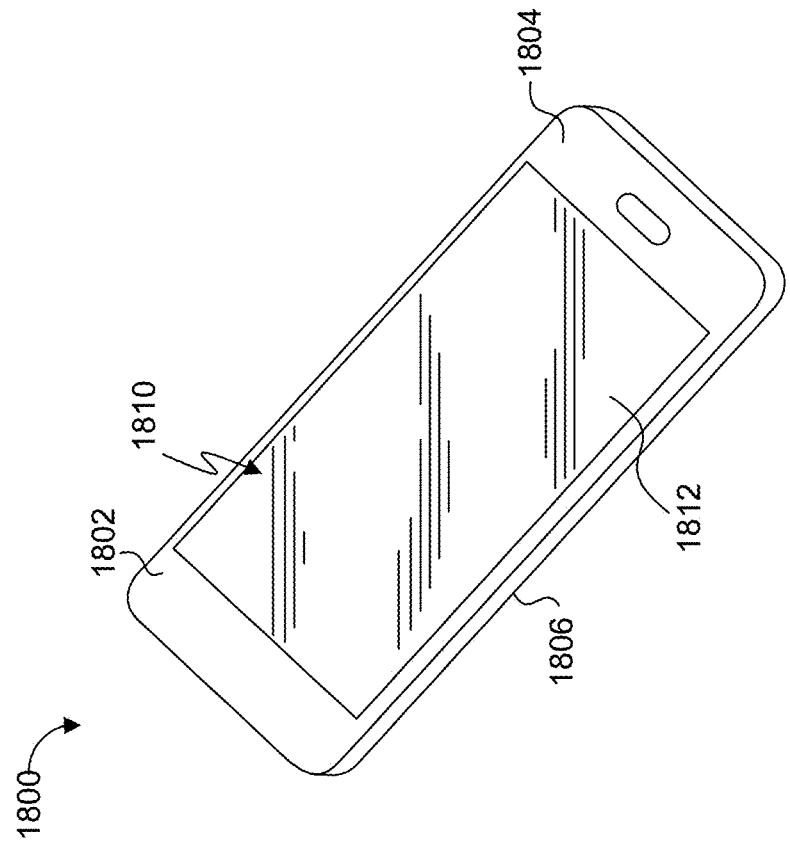
FIG. 18B is a perspective view of the exemplary electronic device of FIG. 18A.
Figure 18A:
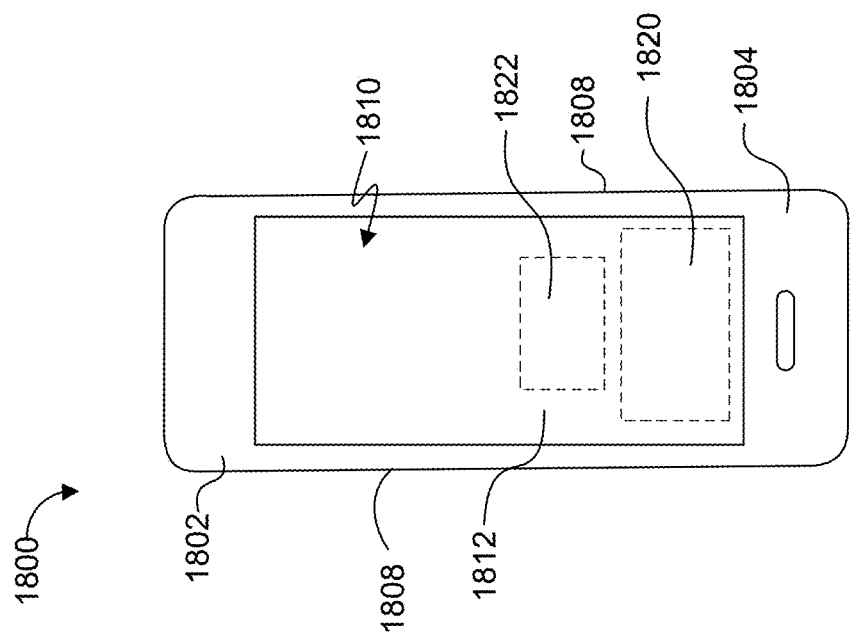
FIG. 18A is a plan view of an exemplary electronic device incorporating a frame according to any of the frames disclosed herein.

The bilinear structures (for example, frame 150) disclosed herein can be incorporated into a device for example a device with a display (for example, consumer electronics, including mobile phones, watches, tablets, computers, navigation systems, and the like), architectural articles, transportation articles (e.g., automobiles, trains, aircraft, sea craft, etc.), appliance articles, or any article that may benefit from some impact force resistance. An exemplary device incorporating any of the bilinear structures disclosed herein is shown in FIGS. 18A and 18B. Specifically, FIGS. 18A and 18B show a consumer electronic product 1800 including a housing 1802 having a front surface 1804, a back surface 1806, and side surfaces 1808. Electrical components that are at least partially inside or entirely within the housing can include at least a controller 1820, a memory 1822, and an electronic display 1810 at or adjacent to front surface 1804 of housing 1802. Electronic display 1810 can be, for example, a light emitting diode (LED) display or an organic light emitting diode (OLED) display.

A cover substrate 1812 can be disposed at or over front surface 1804 of housing 1802 such that it is disposed over electronic display 1810. Cover substrate 1812 can include any of the cover glass layers disclosed herein and may be referred to as a "cover glass." Cover substrate 1812 can serve to protect electronic display 1810 and other components of consumer electronic product 1800 (e.g., controller 1820 and memory 1822) from damage. In aspects, cover substrate 1812 can be bonded to electronic display 1810 with an adhesive. In aspects, cover substrate 1812 can define all or a portion of front surface 1804 of housing 1802. In aspects, cover substrate 1812 can define front surface 1804 of housing 1802 and all or a portion of side surfaces 1808 of housing 1802. In aspects, consumer electronic product 1800 can include a cover substrate defining all or a portion of back surface 1806 of housing 1802.

While various aspects have been described herein, they have been presented by way of example, and not limitation. It should be apparent that adaptations and modifications are intended to be within the meaning and range of equivalents of the disclosed aspects, based on the teaching and guidance presented herein. It therefore will be apparent to one skilled in the art that various changes in form and detail can be made to the aspects disclosed herein without departing from the spirit and scope of the present disclosure. The elements of aspects presented herein are not necessarily mutually exclusive, but may be interchanged to meet various situations as would be appreciated by one of skill in the art.

Aspects of the present disclosure are described in detail herein with reference to aspects thereof as illustrated in the accompanying drawings, in which like reference numerals are used to indicate identical or functionally similar elements. References to "aspects" or "an aspect" indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The examples are illustrative, but not limiting, of the present disclosure. Other suitable modifications and adaptations of the variety of conditions and parameters normally encountered in the field, and which would be apparent to those skilled in the art, are within the spirit and scope of the disclosure.

The indefinite articles "a" and "an" to describe an element or component means that one or more than one of these elements or components is present. Although these articles are conventionally employed to signify that the modified noun is a singular noun, as used herein the articles "a" and "an" also include the plural, unless otherwise stated in specific instances. Similarly, the definite article "the," as used herein, also signifies that the modified noun may be singular or plural, again unless otherwise stated in specific instances.

Directional terms as used herein—for example up, down, right, left, front, back, top, bottom, inward, outward—are made only with reference to the figures as drawn and are not intended to imply absolute orientation.

As used in the claims, "comprising" is an open-ended transitional phrase. A list of elements following the transitional phrase "comprising" is a non-exclusive list, such that elements in addition to those specifically recited in the list may also be present. As used in the claims, "consisting essentially of" or "composed essentially of" limits the composition of a material to the specified materials and those that do not materially affect the basic and novel characteristic(s) of the material. As used in the claims, "consisting of" or "composed entirely of" limits the composition of a material to the specified materials and excludes any material not specified.

Where a range of numerical values is recited herein, comprising upper and lower values, unless otherwise stated in specific circumstances, the range is intended to include the endpoints thereof, and all integers and fractions within the range. It is not intended that the scope of the claims be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. Finally, when the term "about" is used in describing a value or an end-point of a range, the disclosure should be understood to include the specific value or end-point referred to. Whether or not a numerical value or end-point of a range recites "about," the numerical value or end-point of a range is intended to include two aspects: one modified by "about," and one not modified by "about."

As used herein, the term "about" refers to a value that is within ±5% of the value stated. For example, about 3 kPa can include any number between 2.85 kPa and 3.15 kPa. That said, if a percentage is listed and the value of that percentage cannot go above 100%, for example 100 wt % or 99 wt %, "about" does not modify the percentage to include values over 100%.

It is to be understood that the phraseology or terminology used herein is for the purpose of description and not of limitation. The breadth and scope of the present disclosure should not be limited by any of the above-described exemplary aspects, but should be defined in accordance with the following claims and their equivalents.

What is claimed is:

1. A device, comprising:
    a support;
    an electronic display comprising a display surface;
    a cover glass layer disposed over the display surface; and
    a frame disposed between the cover glass layer and the support, the frame comprising a structure comprising a bilinear elastic property in compression.

2. The device of claim 1, wherein the bilinear elastic property in compression is a bilinear compressive stiffness defined by a slope of a force versus displacement curve for a top surface of the cover glass, the force versus displacement curve measured according to the Stiffness Test.

3. The device of claim 2, wherein the bilinear compressive stiffness comprises:
    a first linear slope over a first displacement range from zero displacement ($d_0$) to a first displacement value ($d_1$), and
    a second linear slope over a second displacement range from the first displacement value ($d_1$) to a second displacement value ($d_2$) greater than the first displacement value ($d_1$).

4. The device of claim 3, wherein the first linear slope is greater than the second linear slope.

5. The device of claim 4, wherein the first linear slope ranges from about 1.6 MN/m to about 1176 MN/m.

6. The device of claim 4, wherein the second linear slope ranges from about 0.04 MN/m to about 37.5 MN/mm.

7. The device of claim 4, wherein the first displacement value ($d_1$) is less than or equal to about 0.45 mm.

8. The device of claim 4, wherein the first displacement value ($d_1$) ranges from about 0.01 mm to about 0.45 mm.

9. The device of claim 4, wherein the second displacement value ($d_2$) ranges from about 0.5 mm to about 1.5 mm.

10. The device of claim 1, wherein the bilinear elastic property in compression is a bilinear elastic modulus in compression.

11. The device of claim 10, wherein the bilinear elastic modulus in compression comprises:
    a first elastic modulus ($E_1$) measured over a first strain range from zero strain ($\varepsilon_0$) to a first strain value ($\varepsilon_1$), and
    a second elastic modulus ($E_2$) measured over a second strain range from the first strain value ($\varepsilon_1$) to a second strain value ($\varepsilon_2$) greater than the first strain value ($\varepsilon_1$).

12. The device of claim 11, wherein the first elastic modulus ($E_1$) is greater than the second elastic modulus ($E_2$).

13. The device of claim 1, wherein the structure comprises at least one of a foam, a bistable beam, a spring, or a honeycomb structure.

14. The device of claim 1, wherein the structure comprises a foam material.

15. The device of claim 14, wherein the foam material is an elastomeric foam.

16. The device of claim 1, wherein the frame comprises a perimeter border and a hollow center region.

17. The device of claim 16, wherein the at least a portion of the electronic display is disposed within the hollow center region of the frame.

18. The device of claim 16, wherein the perimeter border comprises a thickness ranging from about 1 mm to about 2 mm.

19. The device of claim 1, wherein the frame is directly bonded to a bottom surface of the cover glass layer.

20. The device of claim 1, wherein the device is a consumer electronic product comprising:
    a housing comprising the support, a front surface, a back surface, and side surfaces; and
    electrical components at least partially within the housing, the electrical components comprising a controller, a memory, and the electronic display, the electronic display at or adjacent the front surface of the housing,
    wherein the cover glass layer forms at least a portion of the housing.

* * * * *